US010661962B2

(12) United States Patent
Hashimoto

(10) Patent No.: US 10,661,962 B2
(45) Date of Patent: May 26, 2020

(54) PEEL-OPENABLE PACKAGE AND OPENING STRUCTURE FOR PEEL-OPENABLE PACKAGE

(71) Applicant: FUTURE LABO CO., LTD., Shiga (JP)

(72) Inventor: Miku Hashimoto, Shiga (JP)

(73) Assignee: FUTURE LABO CO., LTD., Shiga (JP)

( * ) Notice: Subject to any disclaimer, the term of this patent is extended or adjusted under 35 U.S.C. 154(b) by 196 days.

(21) Appl. No.: 15/662,656

(22) Filed: Jul. 28, 2017

(65) Prior Publication Data
US 2017/0320649 A1 Nov. 9, 2017

Related U.S. Application Data

(63) Continuation of application No. PCT/JP2016/051545, filed on Jan. 20, 2016.

(30) Foreign Application Priority Data

Jan. 30, 2015 (JP) .................................. 2015-017158
Jul. 24, 2015 (JP) .................................. 2015-146475

(51) Int. Cl.
*B65D 77/20* (2006.01)
*B32B 27/06* (2006.01)
(Continued)

(52) U.S. Cl.
CPC ............ *B65D 77/2024* (2013.01); *B32B 1/02* (2013.01); *B32B 3/266* (2013.01); *B32B 7/02* (2013.01);
(Continued)

(58) Field of Classification Search
CPC ......... B29D 22/00; B32B 27/00; B32B 27/06; B32B 15/085; B32B 15/09; B32B 15/14;
(Continued)

(56) References Cited

U.S. PATENT DOCUMENTS 3,986,640 A 10/1976 Redmond
2011/0266189 A1 11/2011 Tom et al.

FOREIGN PATENT DOCUMENTS

AU 766573 B2 4/2001
CN 1196709 A 10/1998
(Continued)

OTHER PUBLICATIONS

Office Action issued in Korean Patent Application No. 10-2017-7022546 dated Sep. 10, 2018, with English Translation (12 pages).
(Continued)

*Primary Examiner* — Yan Lan
(74) *Attorney, Agent, or Firm* — Nakanishi IP Associates, LLC

(57) ABSTRACT

A peel-openable package includes a lid. The led includes a sheet member located at a position corresponding to a container portion of a package main body, and a film member bonded to a surface of the sheet member. Cutouts running in a thickness direction of the members and are formed in a peel region defined in a foldable portion of the members. The cutouts and cross a longitudinal direction L and are away from each other by a predetermined interval extending in the longitudinal direction. Facing surfaces of the sheet member and the film member, which are in the peel region corresponding to an area between the cutouts, are bonded together so as to be peelable from each other by an adhesive layer.

11 Claims, 26 Drawing Sheets

(51) Int. Cl.
| | |
|---|---|
| *B32B 27/00* | (2006.01) |
| *B29D 22/00* | (2006.01) |
| *B32B 23/08* | (2006.01) |
| *B32B 1/02* | (2006.01) |
| *B32B 27/36* | (2006.01) |
| *B32B 27/08* | (2006.01) |
| *B32B 7/06* | (2019.01) |
| *B32B 23/06* | (2006.01) |
| *B32B 3/26* | (2006.01) |
| *B32B 15/085* | (2006.01) |
| *B32B 23/04* | (2006.01) |
| *B32B 15/09* | (2006.01) |
| *B32B 15/14* | (2006.01) |
| *B65D 75/58* | (2006.01) |
| *B32B 27/10* | (2006.01) |
| *B32B 7/12* | (2006.01) |
| *B32B 29/00* | (2006.01) |
| *B32B 23/20* | (2006.01) |
| *B32B 27/32* | (2006.01) |
| *B65D 81/32* | (2006.01) |
| *B32B 7/02* | (2019.01) |

(52) U.S. Cl.
CPC ............... *B32B 7/06* (2013.01); *B32B 7/12* (2013.01); *B32B 15/085* (2013.01); *B32B 15/09* (2013.01); *B32B 15/14* (2013.01); *B32B 23/042* (2013.01); *B32B 23/06* (2013.01); *B32B 23/08* (2013.01); *B32B 23/20* (2013.01); *B32B 27/06* (2013.01); *B32B 27/08* (2013.01); *B32B 27/10* (2013.01); *B32B 27/32* (2013.01); *B32B 27/36* (2013.01); *B32B 27/365* (2013.01); *B32B 29/005* (2013.01); *B65D 75/585* (2013.01); *B65D 77/2032* (2013.01); *B65D 81/3294* (2013.01); *B29D 22/00* (2013.01); *B32B 27/00* (2013.01); *B32B 2307/518* (2013.01); *B32B 2307/7163* (2013.01); *B32B 2307/732* (2013.01); *B32B 2307/748* (2013.01); *B32B 2439/40* (2013.01); *B65D 2577/2066* (2013.01)

(58) Field of Classification Search
CPC ...... B32B 2307/7163; B32B 2307/732; B32B 2307/748; B32B 23/042; B32B 23/06; B32B 23/08; B32B 23/20; B32B 2439/40; B32B 27/08; B32B 27/36; B32B 27/365; B32B 29/005; B32B 3/266; B32B 7/02; B32B 7/06; B32B 7/12; B32B 27/32; B32B 1/02; B32B 27/10; B32B 2307/518; B65D 2577/2066; B65D 75/585; B65D 77/2024; B65D 77/2032; B65D 81/3294; B65D 75/58; B65D 81/32
See application file for complete search history.

(56) References Cited

FOREIGN PATENT DOCUMENTS

| | | |
|---|---|---|
| CN | 1399606 A | 2/2003 |
| CN | 102233977 A | 11/2011 |
| CN | 102470661 A | 5/2012 |
| CN | 102712407 A | 10/2012 |
| CN | 203392175 U | 1/2014 |
| JP | S55-36552 B2 | 9/1980 |
| JP | 2014-198601 A | 10/2014 |
| WO | 2009/040629 A2 | 4/2009 |
| WO | 2013/114091 A1 | 8/2013 |
| WO | 2014/141728 A1 | 9/2014 |

OTHER PUBLICATIONS

Office Action issued in Canadian Patent Application No. 2,975,368 dated Apr. 8, 2019 (4 pages).
Notice of Final Rejection issued in Korean Patent Application No. 10-2017-7022546 dated May 17, 2019, with English Translation (6 pages).
Office Action issued in Australian Patent Application No. 2016213482 dated Aug. 10, 2018 (3 pages).
Office Action issued in Canadian Patent Application No. 2,975,368 dated Jul. 5, 2018 (6 pages).
Office Action issued in Australian Patent Application No. 2016213482 dated Feb. 19, 2019 (3 pages).
Office Action issued in Korean Patent Application No. 10-2017-7022546 dated Feb. 20, 2019, with English Translation (6 pages).
Supplementary European Search Report issued in European Patent Application No. EP16743198, dated Nov. 29, 2018 (6 pages).
Office Action issued in Chinese Patent Application No. 201680007699.1 dated Sep. 10, 2018, with English Translation (10 pages).
International Search Report issued in International Application No. PCT/JP2016/051545 dated Mar. 8, 2016, with English translation (3 pages).
Office Action issued in Canadian Patent Application No. 2,975,368, dated Dec. 11, 2019, (5 pages).
Examination Report issued in Indian Patent Application No. 201747028716, dated Oct. 18, 2019, (6 pages).
Office Action issued in Korean Patent Application No. 10-2019-7017636 dated Aug. 20, 2019, with English Translation (12 pages).
Office Action issued in Indonesian Patent Application No. PID201705222, dated Mar. 9, 2020, with English Translation (4 pages).

FIG. 18A      FIG. 18B      FIG. 18C      FIG. 18D
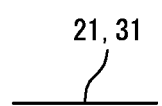 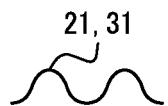 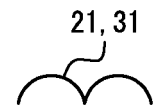 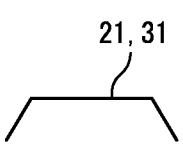
FIG. 18E      FIG. 18F      FIG. 18G      FIG. 18H
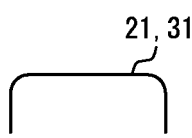   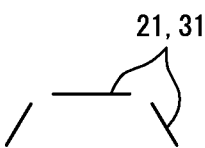

PEEL-OPENABLE PACKAGE AND OPENING STRUCTURE FOR PEEL-OPENABLE PACKAGE

CROSS-REFERENCE TO RELATED APPLICATIONS

This application is a continuation application of International Patent Application No. PCT/JP2016/051545 filed on Jan. 20, 2016, which claims priority to Japanese Patent Application No. 2015-017158 filed on Jan. 30, 2015 and Japanese Patent Application No. 2015-146475 filed on Jul. 24, 2015, the entire contents of which are incorporated by reference.

TECHNICAL FIELD

The present invention relates to a peel-openable package individually packaging a content such as, for example, food, pharmaceutical drugs, cosmetics and the like provided in the form of liquid, paste, powder, granules, tablets or the like; and more specifically, to a peel-openable package allowing the content enclosed in a package main body to be taken out smoothly and an opening structure for the peel-openable package.

BACKGROUND ART

Packages enclosing a necessary amount of the above-described content and allowing the content to be taken out when necessary have been proposed in various types in a large number. A package disclosed in Patent Document 1 is one of such packages.

The package disclosed in Patent Document 1 includes a relatively hard sheet-like flat member and a sheet-like flexible member fixed to a surface of the flat member. A container portion accommodating a content is formed between the flat member and the flexible member. A break-opening portion is formed at a foldable portion of the flat member. The break-opening portion is perpendicular to the foldable portion and is openable when being broken. One of, or both of, two surfaces of the flat member is covered with a sealing member formed of a sealant.

For taking out the content from the package having the above-described structure, the package is folded into two along the foldable portion of the flat member, and the break-openable portion at the foldable portion is broken in a direction generally perpendicular to the foldable portion of the flat member to open the break-openable portion. The container portion is deformed to be crushed, and the content accommodated in the container portion is extruded through the break-openable portion of the flat member that has been broken. Thus, the content is used.

In the case where the break-openable portion is a break-openable line, the break-openable line may be easily broken and opened by, for example, merely the flat member being slightly curved by an external force applied during transportation or conveyance. When this occurs, the content accommodated in the container portion may leak outside. Therefore, the flat member needs to be unnecessarily thick. However, in the case where the flat member is thick, the package is difficult to be folded and thus it is made difficult to break-open the break-openable line.

CITATION LIST

Patent Literature

[Patent Document 1] Japanese Patent Publication for Opposition No. Sho 55-36552

SUMMARY OF INVENTION

One or more embodiments of the present invention provide a peel-openable package in which portions of an inner member and an outer member, which are in a peel region and are bonded together so as to be peelable from each other, are easily and simply peel-opened, and a content accommodated in a package main body is taken out smoothly through the peel-opened portion of the members; and also providing an opening structure for the peel-openable package.

One or more embodiments of the present invention are directed to a peel-openable package, including a package main body having a content enclosed therein. At least a part of the package main body includes an inner member located at a position corresponding to an inner portion of the package main body; and an outer member bonded to a surface of the inner member, the surface corresponding to an outer portion of the package main body. The inner member and the outer member have a foldable portion in an area thereof where the inner member and the outer member are bonded together. The foldable portion includes a peel region where the inner member and the outer member are allowed to be peeled off from each other. The foldable portion includes a cutout, in the peel region, in each of the inner member and the outer member, the cutouts extending so as to cross a direction corresponding to a folding direction in which the foldable portion is folded, and the cutouts each being formed into an opening running in a thickness direction when the foldable portion is folded. The cutout formed in the inner member and the output formed in the outer member are away from each other by a predetermined interval, the predetermined interval extending in the direction corresponding to the folding direction. Facing surfaces of the inner member and the outer member facing each other are bonded together by an adhesive layer provided between the facing surfaces such that the facing surfaces are peelable from each other, the facing faces being defined in at least the peel region.

One or more embodiments of the present invention are also directed to an opening structure for a peel-openable package. The opening structure is usable to peel a part of a package main body having a content enclosed therein to open the package main body. At least a part of the package main body includes an inner member located at a position corresponding to an inner portion of the package main body; and an outer member bonded to a surface of the inner member, the surface corresponding to an outer portion of the package main body. The inner member and the outer member have a foldable portion in an area thereof where the inner member and the outer member are bonded together. The foldable portion includes a peel region where the inner member and the outer member are allowed to be peeled off from each other. The foldable portion include a cutout, in the peel region, in each of the inner member and the outer member, the cutouts extending so as to cross a direction corresponding to a folding direction in which the foldable portion is folded, and the cutouts each being formed into an opening running in a thickness direction when the foldable portion is folded. The cutout formed in the inner member and the output formed in the outer member are away from each other by a predetermined interval, the predetermined interval extending in the direction corresponding to the folding direction. An adhesive layer is provided between facing surfaces of the inner member and the outer member facing each other, the facing surfaces being defined in at least the peel region, the adhesive layer bonding the facing surfaces together such that the facing surfaces are peelable from each other.

The "cutout formed into an opening" represents a concept encompassing, for example, a cutout running in the thickness direction when the inner member and the outer member are folded into two, and a cutout broken or ruptured to run in the thickness direction when the inner member and the outer member are folded into two.

The "at least a part" represents a concept encompassing, for example, a foldable portion in the entirety of the package main body and the entirety of a portion of the package main body where the foldable portion is formed. The "direction corresponding to the folding direction" represents a concept encompassing, for example, a longitudinal direction of the entirety of the package main body having a generally rectangular shape or a longitudinal direction of the inner member or the outer member.

The "content" may be provided in the form of, for example, liquid, paste, powder, granules, tablets or the like.

Each of the cutouts may be linear, may be arced, may be wave-shaped, may have two peaks, may be M-shaped, may be V-shaped, or the like, as seen in the thickness direction of the inner member and the outer member.

The inner member may be a sheet member formed of a single material or a composite material such as, for example, amorphous polyethyleneterephthalate (V-PET), polypropylene (PP), biaxially rolled polyester (OPET), biodegradable plastic (PLA), polycarbonate (PC), polyethylene (PE), polystyrene (PS), cardboard paper, a metal material or the like.

Specifically, the inner member includes the sheet base formed of any of the above-listed materials and a synthetic resin seal member bonded to one surface of the seat base to be integral with the sheet base.

The outer member may be a film member or a foil member formed of a single material or a composite material such as, for example, biaxially rolled polyester (OPET), biaxially rolled polypropylene (OPP), polyethylene (PE), cellulose propionate (CP), a metal material (aluminum) or the like.

The material and the thickness of the inner member and the outer member may be changed in accordance with the type of the content or the shape of the package main body.

The adhesive layer may be formed of, for example, an adhesive such as a hotmelt adhesive, a urethane-based adhesive, or any other type of adhesive. The peel-adhesiveness of the adhesive layer may be adjusted to a desirable level by various methods. The methods includes a method of adjusting by the pressurization force, a heating temperature, a pressurization time period or a heating time period at the time of heating the adhesive layer for pressure adhesion; a method of adjusting by the pressurization jig or the shape of a pressurization surface of the pressurization jig; a method of adjusting by the composition of the adhesive; and a method of adjusting by the application pattern of the adhesive.

According to one or more embodiments of the present invention, the portions of the inner member and the outer member, which are in the peel region and are bonded together so as to be peelable from each other, are peel-opened simply and easily, and the content enclosed in the package main body is taken out smoothly through the peel-opened portion.

This will be described in more detail. The peel-openable package is folded into two along the foldable portion such that the inner member of the package main body is directed inward and the outer member is directed outward. Thus, the portions of the inner member and the outer member, which are in the peel region and are bonded together so as to be peelable from each other, are peel-opened against the adhesive force of the adhesive layer.

The radius of curvature of the outer member is larger than that of the inner member in the foldable portion. The inner member is pushed and contracted when being folded. The outer member is pulled in the folding direction by a tensile force applied to the foldable portion.

As a result, the portions of the inner member and the outer member, which are in the peel region and are bonded together so as to be peelable from each other, are displaced in opposite directions from each other. Therefore, the portions of the inner member and the outer member, which are in the peel region corresponding to the area between the cutouts and are bonded together so as to be peelable from each other, are peel-opened against the adhesive force of the adhesive layer.

As described above, when the foldable portion is folded into two, the portions of the members, which are bonded together so as to be peelable from each other, are peel-opened, and the cutouts are each formed into the opening running in the thickness direction.

Therefore, the cutouts formed in the inner member and the outer member are put into communication with the inside of the container portion enclosing the content, and the area between the facing surfaces of the members in the peel region is opened to have such a size and such a shape as to allow the content enclosed in the container portion to be taken out.

As a result, the portions of the inner member and the outer member, which are in the peel region and are bonded together so as to be peelable from each other, are peel-opened more simply and more easily than, for example, in the case where a sealing member bonded to cover the cutouts or a break-openable line is broken to be opened. The content enclosed in the package main body is taken out smoothly through the peel-opened portion of the members.

In addition, until the portions of the inner member and the outer member, which are in the peel region and are bonded together so as to be peelable from each other, are peel-opened, the cutouts formed in the members are not put into communication with each other. Thus, the content enclosed in the package main body is prevented with certainty from leaking.

The portions of the inner member and the outer member, which are in the peel region and are bonded together so as to be peelable from each other, are, for example, curved or warped and thus are put pushed against each other by an inner pressure of the content enclosed in the package main body. Therefore, the content is prevented with more certainty from leaking.

The opening structure of the peel-openable package according to one or more embodiments of the present invention is not of a type by which a member is broken to be opened, but is of a type by which the members are peel-opened. Therefore, it is not necessary to, for example, process the cutouts, the line, or the like precisely. In addition, even if the opening structure is slightly warped during, for example, transportation or conveyance, the portions of the members that are bonded together so as to be peelable from each other are not likely to be peel-opened, and the content enclosed in the package main body is prevented from leaking.

A conventional package that is to be broken to be opened is easily broken to be opened when, for example, being slightly warped during transportation or conveyance. Therefore, at least one of a flat portion and a flexible portion needs to be unnecessarily thick. However, in the case where the member is thick, it is time-consuming to thermally weld the members and the speed of the entire production process is not made high.

By contrast, the operation structure of the peel-openable package according to one or more embodiments of the present invention is of a type by which the portions of the members that are bonded together so as to be peelable from each other are peel-opened. Therefore, at least one of, or both of, the inner member and the outer member may be thinner than the members of the conventional package by, for example, about 20% to 50%.

Since one of the members is made thin, the time required to thermally weld and seal the members is shortened. In addition, the speed for packaging the content, or the speed of the entire production process, may be set to be higher by, for example, about 20% to 50%. Thus, the peel-openable package according to one or more embodiments of the present invention is produced at lower cost.

In the case where one of the members formed to be thick is held between the other of the members formed to be thin, the portions of the other member outer to the one member are thermally welded to provide a sealing. Thus, such portions of the thin member are thermally welded at a high speed to provide a package.

In one or more embodiments of the present invention, the inner member may be thicker than the outer member.

According to one or more embodiments of the present invention, the portions of the inner member and the outer member, which are in the peel region and are bonded together so as to be peelable from each other, are peel-opened with certainty.

This will be described in more detail. The peel-openable package is folded such that the inner member of the package main body having a larger thickness is directed inward and the outer member thinner than the inner member is directed outward. Thus, the radius of curvature of the outer member is larger than that of the inner member by the thickness of the inner member. Therefore, the inner member is more pulled in the folding direction.

Even if the cutouts formed in the peel region of the inner member and the outer member are linear, the portions of the inner member and the outer member, which are in the peel region corresponding to the area between the cutouts and are bonded together so as to be peelable from each other, are peel-opened with certainty.

In one or more embodiments of the present invention, the adhesive layer may be provided between the facing surfaces in the peel region, in positional correspondence with an area between the cutouts formed in the inner member and the outer member.

According to one or more embodiments of the present invention, the portions of the inner member and the outer member, which are in the peel region corresponding to the area between the cutouts and are bonded together so as to be peelable from each other, are peel-opened with more certainty.

This will be described in more detail. When the peel-openable package is folded into two, the portions of the inner member and the outer member, which are in the peel region corresponding to the area between the cutouts and are bonded together so as to be peelable from each other, are peel-opened with certainty. In addition, the content enclosed in the package main body is taken out with certainty through the peel-opened portion of the inner member and the outer member.

In one or more embodiments of the present invention, the inner member and the outer member may not be allowed to be peeled off from each other in a region other than the peel region.

According to one or more embodiments of the present invention, in a region other than the peel region, the inner member and the outer member are prevented with certainty from being peeled off from each other.

This will be described in more detail. The facing surfaces of the inner member and the outer member in a region other than the peel region are bonded together so as not to be peelable from each other by an adhesive layer formed of an adhesive or the like. Therefore, when the peel-openable package is folded into two, the facing surfaces of the inner member and the outer member in a region other than the peel region are prevented with certainty from being peeled off from each other.

As a result, the content is prevented with certainty from leaking through a portion other than the peel region of the inner member and the outer member.

In one or more embodiments of the present invention, the cutouts may each have a width shorter than a width of the inner member.

According to one or more embodiments of the present invention, the content enclosed in the package main body is taken out from a portion of the peel-openable package that is inner to both of the two ends thereof in the width direction.

This will be described in more detail. The cutouts each have a width which is shorter than a width of the inner member (desirably shorter than, or equal to, 70% of the width of the inner member). Thus, the cutouts in the inner member and the outer member may be formed in a portion inner to the two ends, in the width direction, of the respective members.

Therefore, the content enclosed in the package main body is taken out with certainty through the cutouts formed in a portion inner to the two ends, of the peel-openable package, in the width direction.

As a result, the content is prevented from being extruded from a portion other than the portion inner to the two ends, in the width direction, of the peel-openable package, for example, from two ends of the peel-openable package.

In one or more embodiments of the present invention, the predetermined interval between the cutouts formed in the inner member and the outer member may have a length that is about 0.5 times to about 100 times a thickness of the inner member.

According to one or more embodiments of the present invention, the facing surfaces of the inner member and the outer member, which are in the peel region corresponding to the area between the cutouts, are bonded together so as to be peelable from each other.

This will be described in more detail. The interval between the cutouts has a length that is about 0.5 times to about 100 times the thickness of the inner member. Therefore, the facing surfaces of the inner member and the outer member, which are in the region corresponding to the area between the cutouts, are each guaranteed to have a sufficient area size to be bonded together in a close contact state.

Therefore, the facing surfaces of the inner member and the outer member, in the peel region corresponding to the area between the cutouts, may be bonded together so as to be peelable from each other. The facing surfaces may bonded together in a close contact state, such that the content enclosed in the package main body is prevented from leaking.

As a result, the portions of the inner member and the outer member, which are in the peel region corresponding to the area between the cutouts and are bonded together so as to be peelable from each other, are merely peel-opened, so that the content enclosed in the package main body is taken out with more certainly through the peel-opened portion of the members.

This will be described in more detail. In the case where the interval between the cutouts has a length that is shorter than, or equal to, about 0.5 times the thickness of the inner member, the area size of the facing surfaces to be bonded together, the facing surfaces corresponding to the area between the cutouts, is too small. In this case, it is difficult to bond the facing surfaces corresponding to the area between the cutouts to each other in a close contact state. As a result, the content enclosed in the package main body is likely to be leaking.

In the case where the interval between the cutouts has a length that is longer than, or equal to, about 100 times the thickness of the inner member, the area size of the facing surfaces to be bonded together, the facing surfaces corresponding to the area between the cutouts, is too large. In this case, it is difficult to peel the bonded portions corresponding to the area between the cutouts from each other. As a result, the bonded portions are likely to be left partially unpeeled.

Therefore, it is desirable that the interval between the cutouts has a length that is about 0.5 times to 100 times the thickness of the inner member.

In one or more embodiments of the present invention, one of the cutouts formed in the inner member and the outer member may be longer than the other of the cutouts.

According to one or more embodiments of the present invention, the portions of the inner member and the outer member, which are in the peel region corresponding to the area between the cutouts and are bonded together so as to be peelable from each other, are peel-opened simply and easily.

This will be described in more detail. The cutouts formed in the inner member and the outer member have different lengths. Therefore, when the peel-openable package is folded into two, the level of displacement in the folding direction caused to the portions of the member having a longer cutout and the member having a shorter cutout, which are bonded together so as to be peelable from each other, is made larger.

Therefore, in the case where the cutouts have different lengths, the portions of the inner member and the outer member, which are in the peel region and are bonded together so as to be peelable from each other, are peel-openable more simply and more easily than in the case where the cutouts have the same length.

In one or more embodiments of the present invention, the cutouts formed in the inner member and the outer member may have the same shape as each other, or different shapes from each other, as seen in the thickness direction.

According to one or more embodiments of the present invention, the portions of the inner member and the outer member, which are in the peel region corresponding to the area between the cutouts and are bonded together so as to be peelable from each other, are peel-opened more simply and more easily.

This will be described in more detail. In the case where the cutouts have the same shape, substantially the same level of displacement is caused in the folding direction to the portions of the inner member and the outer member, which are in the peel region and are bonded together so as to be peelable from each other. Therefore, the portions, which are in the peel region corresponding to the area between the cutouts and are bonded together so as to be peelable from each other, are peel-opened substantially equally.

In the case where the cutouts have different shapes, different levels of displacement are caused in the folding direction to the portions of the members, which are bonded together so as to be peelable from each other. Therefore, the portions, which are in the peel region corresponding to the area between the cutouts and are bonded together so as to be peelable from each other, are peel-opened more simply and more easily.

In one or more embodiments of the present invention, the cutouts may each include a plurality of holes running in the thickness direction, the plurality of holes being provided in a perforation extending so as to cross the direction corresponding to the folding direction.

According to one or more embodiments of the present invention, the portions of the inner member and the outer member, which are in the peel region corresponding to the area between the cutouts and are bonded together so as to be peelable from each other, are peel-opened more simply and more easily.

This will be described in more detail. When the peel-openable package is folded into two, areas between adjacent holes provided in the form of a perforation are peeled off or broken. Therefore, the holes are made continuous to each other to form one hole.

Thus, like in the case of the cutouts described above, the area between the facing surfaces of the inner member and the outer member, which correspond to the area between the cutouts, are put into communication with the inside of the package main body enclosing the content. In addition, the cutouts are opened to have such a size and such a shape as to allow the content enclosed in the package main body to be taken out.

In one or more embodiments of the present invention, a folding line assisting folding of the inner member may be provided between two ends of the inner member in a width direction and two ends of the cutouts in the width direction.

According to one or more embodiments of the present invention, the peel-openable package is folded into two more easily.

This will be described in more detail. The folding of the peel-openable package is assisted by the folding lines provided in the inner member. Therefore, the resistance of the inner member against the folding is decreased at the time when the peel-openable package is folded into two.

Thus, the peel-openable package is folded into two more easily. In addition, the portions of the inner member and the outer member, which are in the peel region corresponding to the area between the cutouts and are bonded together so as to be peelable from each other, are peel-opened with more certainty.

As a result, an error in the opening is prevented with certainty. The content enclosed in the package main body is taken out with more certainty through the peel-opened portion of the members.

In one or more embodiments of the present invention, a sealing member may be provided between the facing surfaces, of the inner member and the outer member, defined in at least the peel region, the sealing member being broken when the inner member is folded at a predetermined angle or greater; and the sealing member may be located on a surface of the inner member that is to be a peak-side surface when the inner member is folded, and cover the cutout formed in the inner member.

The sealing portion may be formed of a single material or a single material or a composite material that is the same as that of the inner member or the outer member.

According to one or more embodiments of the present invention, the content enclosed in the package main body is prevented from leaking when the outer member covering the cutout in the inner member is peeled off.

This will be described in more detail. In the case where the package main body of a peel-openable package not having a special structure is deformed by a stress (e.g., bending force, pressure, etc.) applied from outside while being moved, for example, transported or conveyed, or while being packaged, the portions of the inner member and the outer member, which are bonded together so as to be peelable from each other, may be peeled off from each other.

When the outer member covering the cutout in the inner member is peeled off, the cutout is released from a sealed state. Therefore, the content enclosed in the package main body is not prevented from leaking through the cutout in the inner member.

In addition, foreign objects such as dust, bugs or the like easily enter the package main body through the cutout in the inner member. Therefore, it becomes difficult to keep the quality of the content at the level when the content is first enclosed, and thus it becomes difficult to keep the content in a highly hygienic state.

Now, it is assumed that the package main body of the peel-openable package according to one or more embodiments of the present invention is deformed by a stress applied from outside. Even if the outer member covering the cutout in the inner member is peeled off, the cutout is not released from the sealed state until the inner member is folded such that the angle between the two folded portions becomes a predetermined folding angle or smaller to break the sealing portion covering the cutout in the inner member. Thus, the cutout formed in the inner member is kept sealed.

Therefore, even if the outer member covering the cutout in the inner member is peeled off, the content enclosed in package main body is prevented with certainty from leaking through the cutout in the inner member. In addition, the foreign objects as described above are prevented with certainty from entering the package main body through the cutout in the inner member.

As a result, the quality of the content is kept at the level when the content is first enclosed, and thus the content is kept in a highly hygienic state.

The cutout is released from the state of being sealed by the sealing portion by merely folding the inner member (sheet member 20 in the examples) such that the angle between the two folded portions becomes a predetermined folding angle or smaller to break the sealing portion covering the cutout in the inner member (sheet member 20 in the examples). Therefore, the content enclosed in the package main body is taken out smoothly from the peel-opened portion.

The sealing portion may be formed of a single material or a composite material that is same as that of the inner member or the outer member. In this case, the physical properties of at least one of the members, and the physical properties of the sealing portion, are provided in a synergistic manner. For example, the gas barrier property, the anti-humidity property, the level of odor or the like is improved, and the quality of the content enclosed in the package main body is kept at a high level.

In one or more embodiments of the present invention, the sealing member may include a sealing film or a coated sealing layer having a thickness smaller than a thickness of the outer member.

According to one or more embodiments of the present invention, the cutout in the inner member is sealed with more certainty. The content enclosed in the package main body is prevented with more certainty from leaking.

This will be described in more detail. The sealing film or the sealing layer is thinner than the outer member.

Therefore, the sealing film or the sealing layer may be located on a surface of the inner member that is to be a peak-side surface when the inner member is folded, and may be in close contact with the inner member to cover the cutout in the inner member.

As a result, even if the outer member covering the cutout in the inner member is peeled off, the content enclosed in the package main body is prevented with more certainty from leaking through the cutout in the inner member.

In addition, the sealing film or the sealing layer covering the cutout in the inner member (sheet member 20 in the examples) is broken merely by folding the inner member such that the angle between the two folded portions becomes a predetermined folding angle or smaller. Therefore, the cutout is easily released from the state of being sealed by the sealing film or the sealing layer.

The sealing layer is formed by coating so as to cover the cutout in the inner member. Therefore, the sealing layer is made thinner than the sealing film. Thus, the folding force required to break the sealing layer is smaller than the folding force required to break the sealing film. For this reason, the sealing layer is broken more simply and more easily than the sealing film.

One or more embodiments of the present invention provide a peel-openable package in which portions of an inner member and an outer member, which are in a peel region and are bonded together so as to be peelable from each other, are easily and simply peel-opened, and a content accommodated in a package main body is taken out smoothly through the peel-opened portion of the members; and also provides an opening structure for the peel-openable package.

BRIEF DESCRIPTION OF DRAWINGS

FIGS. 18A-18H show examples in which the cutouts are provided in desirable shapes.

DESCRIPTION OF EMBODIMENTS

Hereinafter, an embodiment according to the present invention will be described with reference to the drawings.

Example 1

Figure 1A:
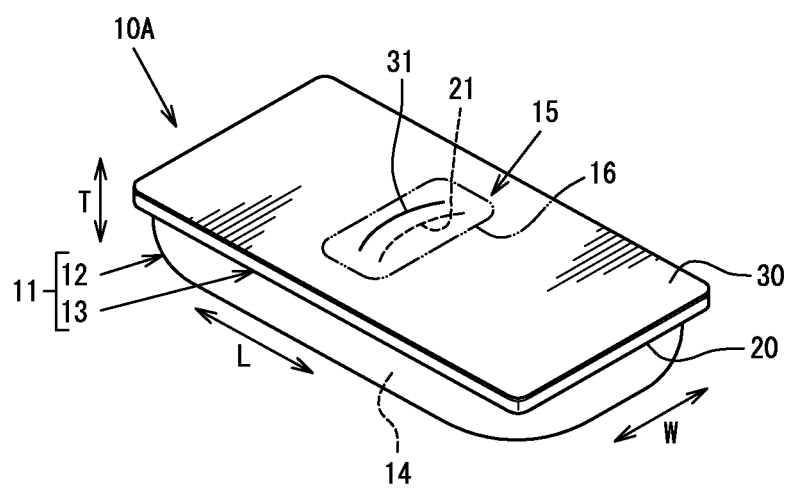
FIGS. 1A and 1B show a peel-openable package in example 1 including an opening structure.
Figure 1B:
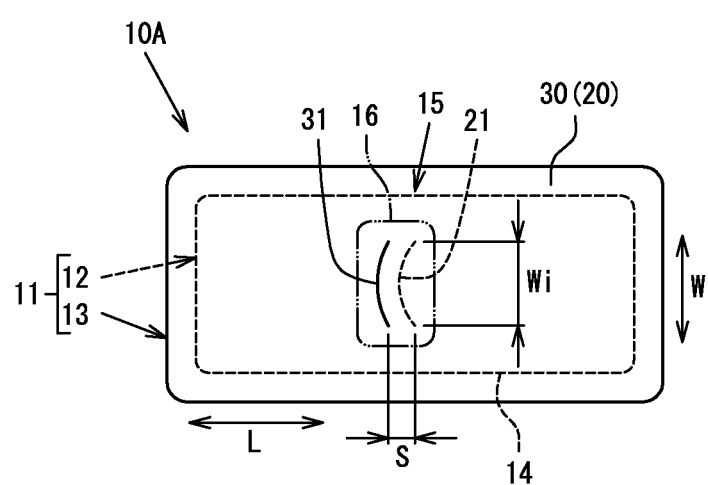

FIGS. 1A and 1B show a peel-openable package 10A having an opening structure in example 1. In more detail, FIG. 1A is a perspective view of the peel-openable package 10A as seen from above, and FIG. 1B is a plan view of the peel-openable package 10A as seen from the front side thereof.

Figure 2A:
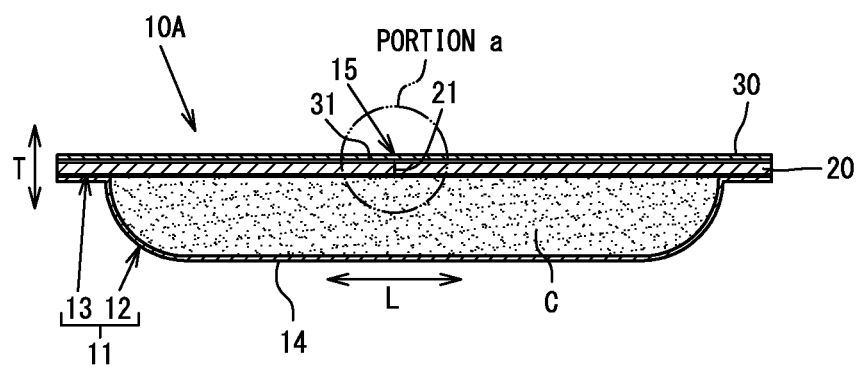
FIGS. 2A and 2B show the opening structure in the peel-openable package.
Figure 2B:
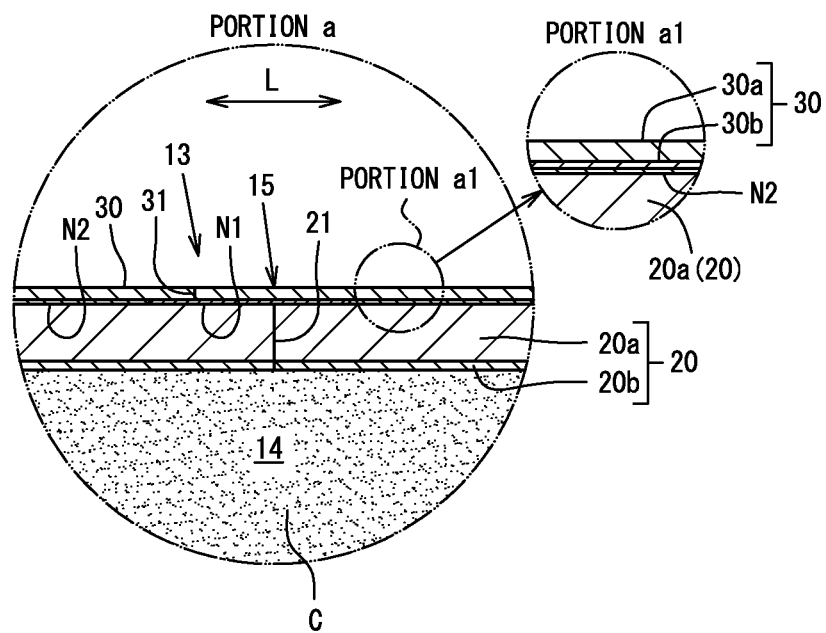

FIGS. 2A and 2B shows the opening structure of the peel-openable package 10A. In more detail, FIG. 2A is a cross-sectional view of the peel-openable package 10A taken along a center line in a width direction W, and FIG. 2B is an enlarged cross-sectional view of portion "a" in FIG. 2A.

The peel-openable package 10A in example 1 is a small package including a package main body 11 having a content C enclosed therein. The package main body 11 includes a main body portion 12 having a generally U-shaped cross-section and a lid 13 closing a top opening of the main body portion 12 (see FIG. 1(a) and FIG. 1(b)).

The main body portion 12 is formed of a synthetic resin film having a thickness of 100 μm (e.g., Diamiron F (trade name) produced by Mitsubishi Chemical Corporation). A container portion 14 to be filled with the content C in an amount required to be used once is formed in the main body portion 12 (see FIGS. 2A and 2B).

The lid 13 includes a synthetic resin flexible sheet member 20 that is located at a position corresponding to an inner portion of the package main body 1 (specifically, the container portion 14 of the main body portion 12) and has such a thickness as to be foldable by fingers of a human, and also includes a synthetic resin film member 30 bonded to a front surface of the sheet member 20, the front surface corresponding to an outer portion of the package main body 11.

A peripheral portion of a rear surface of the sheet member 20 of the lid 13 is thermally welded to a peripheral portion of a front surface of the main body portion 12, so that the top opening of the main body portion 12 is closed (see FIGS. 1A and 1B).

The lid 13 includes a foldable portion 15, along which the lid 13 is foldable into two, in a central portion thereof in a longitudinal direction L. The foldable portion 15 extends in the width direction W of the lid 13, which is perpendicular to the longitudinal direction L (the longitudinal direction L corresponds to a folding direction G) (see FIGS. 1A and 1B).

A peel region 16 represented by the two-dot chain line in the figures is defined in a central portion, in the width direction W, of the foldable portion 15. In the peel region 16, the sheet member 20 and the film member 30 are peelable from each other.

The sheet member 20 and the film member 30 respectively include slit-like cutouts 21 and 31 in the peel region 16. When the sheet member 20 and the film member 30 are folded into two, the cutouts 21 and 31 are each formed into an opening running in a thickness direction T thereof (see FIGS. 2A and 2B). The cutouts 21 and 31 are formed by use of a Thomson-type punching machine (not shown).

The cutouts 21 and 31 are arcked protruding toward one end, in the longitudinal direction L, of the sheet member 20 and the film member 30 as seen in the thickness direction T (the cutouts 21 and 31 protrude toward the same end in the longitudinal direction L). The cutouts 21 and 31 have the same shape and the same length as each other (see FIGS. 1A and 1B).

The cutout 21 formed in the sheet member 20 and the cutout 31 formed in the film member 30 are formed to cross the longitudinal direction L of the sheet member 20 and the film member 30, and are away from each other by a predetermined interval. The predetermined interval extends in the longitudinal direction L.

The interval S between the cutouts 21 and 31 is about 0.5 times to about 100 times (desirable about 10 times) a thickness of the sheet member 20 (see FIGS. 1A and 1B). The cutouts 21 and 31 each have a width Wi, which is shorter than a width of the sheet member 20 (desirably shorter than, or equal to, 70% of the width of the sheet member 20).

The sheet member 20 includes a sheet base 20a that has such a thickness as to be foldable by fingers of a human and is formed of amorphous polyethyleneterephthalate, and a seal member 20b bonded to a rear surface of the sheet base 20a, the rear surface facing the container portion 14. The seal member 20b is formed of polyethylene. The seal member 20b has such a size and such a shape as to cover the entirety of the rear surface of the sheet base 20a (see the enlarged view of portion "a" in FIG. 2A).

In the sheet member 20, the sheet base 20a has a thickness in the range of 0.1 mm to 1.0 mm, desirably 0.2 mm to 0.5 mm. The seal member 20b has a thickness in the range of 0.01 mm to 0.5 mm, desirably 0.03 mm to 0.3 mm.

The film member 30 is bonded to the front surface of the sheet member 20 having a two-layer structure including the sheet base 20a and the seal member 20b, so that a three-layer structure is provided (see the enlarged view of portion "a" in FIG. 2A).

In the case where the content C requires a gas barrier property, an anti-humidity property or the like, a seal layer (not shown) formed by, for example, vapor deposition, coating, or composite formation is provided between the seat base 20a and the seal member 20b.

The film member 30 has a two-layer structure including a film base 30a formed of biaxially rolled polyester, and a seal member 30b formed of polyethylene and bonded to a rear surface of the film base 30a. The film base 30a has such a thickness that is foldable and thus deformable by fingers of a human to be peelable.

In the film member 30, the film base 30a has a thickness in the range of 0.005 mm to 0.5 mm, desirably 0.01 mm to 0.1 mm. The seal member 30b has a thickness in the range of 0.005 mm to 0.1 mm, desirably 0.01 mm to 0.2 mm.

The film member 30 has such a size and such a shape as to cover the entirety of the front surface of the sheet member 20, and the seal member 30b has such a size and such a shape as to cover the entirety of the rear surface of the film base 30a.

In the case where the content C requires a gas barrier property, an anti-humidity property or the like, the film member 30 having the multi-layer structure with the above-described sealing layer is used (see an enlarged view of portion "a1" in FIG. 2B).

Facing surfaces in the peel region 16 corresponding to an area between the cutouts 21 and 31 formed in the sheet member 20 and the film member 30 are bonded together by an adhesive layer N1 provided between the facing surfaces. The adhesive layer N1 has a pressure-adhesive force that allows the facing surfaces to be peeled off from each other, and thus the facing surfaces are bonded together so as to be peelable from each other.

In a region other than the peel region 16, the facing surfaces of the sheet member 20 and the film member 30 are bonded together by an adhesive layer N2 provided between the facing surfaces. The adhesive layer N2 has a pressure-adhesive force that does not allow the facing surfaces to be peeled off from each other. Thus, in the region other than the peel region 16, the facing surfaces are bonded together so as not to be peelable from each other.

The film member 30 may have a one-layer structure including a film that has a thickness of, for example, 0.05 mm to 0.5 mm and is formed of cellulose propionate or polyethylene.

The sheet 20 may have a two-layer structure as long as the sheet member 20 in such a state and the film member 30 are bondable to each other.

A method for taking out the content C from the peel-openable package 10A having the above-described structure will be described.

Figure 3A:
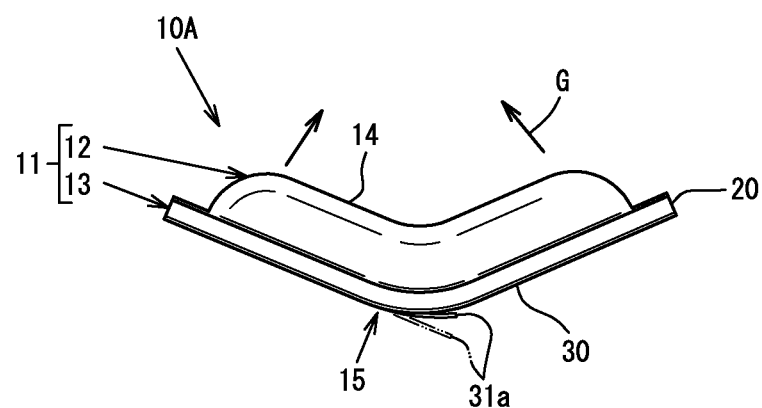
FIGS. 3A and 3B show how to take out a content from the peel-openable package in example 1.
Figure 3B:
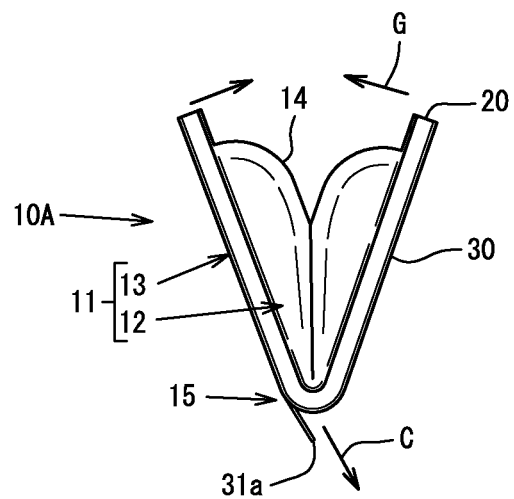

FIGS. 3A and 3B show how to take out the content C from the peel-openable package 10A in example 1. In more detail, FIG. 3A is a side view of the peel-openable package 10A in a state of starting to be folded, and FIG. 3B is a side view of the peel-openable package 10A in a state of being folded into two.

Figure 4A:
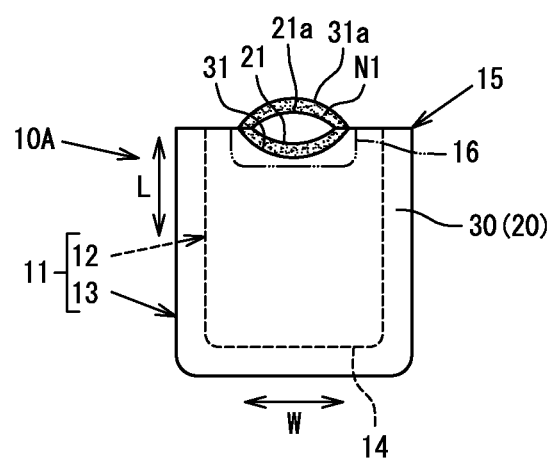
FIGS. 4A and 4B show the peel-openable package in a state of being folded into two.
Figure 4B:
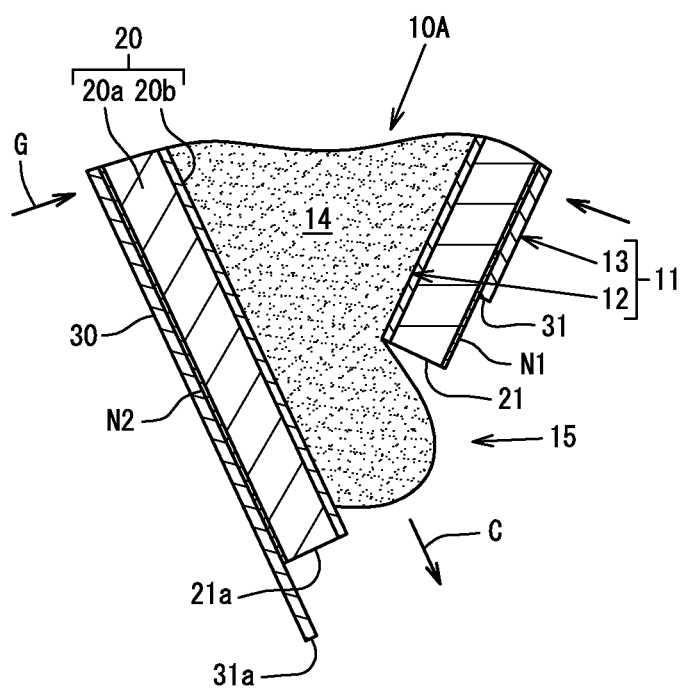

FIGS. 4A and 4B show the peel-openable package 10A in a state of being folded into two. In more detail, FIG. 4A is a front view of the peel-openable package 10A in a state of being folded into two, and FIG. 4B is a partial enlarged cross-sectional view showing that the content C is being taken out from the peel-openable package 10A.

The peel-openable package 10A in example 1 is held in a state where the lid 13 of the package main body 11 is directed downward, and the foldable portion 15 is folded into two. Thus, the portions of the sheet member 20 and the film member 30, which are in the peel region 16 corresponding to the area between the cutouts 21 and 31 and are bonded together so as to be peelable from each other, are peel-opened against the adhesive force of the adhesive layer N1 (see FIGS. 3A and 3B).

This will be described in more detail. The peel-openable package 10A is folded along the foldable portion 15 such that the sheet member 20 having a larger thickness is directed inward and the film member 30 thinner than the sheet member 20 is directed outward. Thus, the radius of curvature of the film member 30 is larger than that of the sheet member 20 by the thickness of the sheet member 20. The sheet member 20 is pushed and contracted when being folded. The film member 30 is pulled in the folding direction G by a tensile force applied to the foldable portion 15.

As a result, the portions of the sheet member 20 and the film member 30, which are in the peel region 16 and are bonded together so as to be peelable from each other, are displaced in opposite directions from each other. Therefore, the portions, which correspond to the area between the cutouts 21 and 31 and are bonded together so as to be peelable from each other, are peel-opened against the adhesive force of the adhesive layer N1 (see FIGS. 4A and 4B).

As described above, when the sheet member 20 and the film member 30 are folded, facing walls of the cutout 21 formed in the sheet member 20 are separated from each other, and facing walls of the cutout 31 formed in the film member 30 are separated from each other. Thus, the cutouts 21 and 31 are each formed into the opening running in the thickness direction T.

In addition, arced tongues 21a and 31a of the cutouts 21 and 31 protrude obliquely outward. Therefore, the cutouts 21 and 31 formed in the sheet member 20 and the film member 30 are put into communication with the container portion 14 filled with the content C, and the cutouts 21 and 31 are opened to have such a size and such a shape as to allow the content C filling the container portion 14 to be taken out (see FIG. 4B).

As a result, the portions of the sheet member 20 and the film member 30, which are in the peel region 16 corresponding to the area between the cutouts 21 and 31 and are bonded together so as to be peelable from each other, are peel-opened more simply and more easily than, for example, a sealing member bonded to cover the cutouts or a break-openable line being broken to be opened. Thus, the content C filling the container portion 14 is taken out smoothly through the peel-opened portion of the cutouts 21 and 31.

In addition, when the portions, which correspond to the area between the cutouts 21 and 31 and are bonded together so as to be peelable from each other, are peel-opened, the content C is in contact with the tongues 21a and 31a while being extruded through the cutouts 21 and 31 (see FIG. 4B).

Therefore, the content C enclosed in the peel-openable package 10A is not likely to be extruded at once, and thus the content C is prevented from splashing around.

The interval between the cutouts 21 and 31 formed in the sheet member 20 and the film member 30 has a length that is about 0.5 times to about 100 times the thickness of the sheet member 20. Therefore, the facing surfaces of the sheet member 20 and the film member 30, that are in the region corresponding to the area between the cutouts 21 and 31, are each guaranteed to have a sufficient area size to be bonded together in a close contact state.

Until the portions of the sheet member 20 and the film member 30, which are in the peel region 16 and are bonded together so as to be peelable from each other, are peel-opened, the cutouts 21 and 31 formed in the sheet member 20 and the film member 30 are not put into communication with each other. Thus, the content C enclosed in the peel-openable package 10A is prevented with certainty from leaking through the cutouts 21 and 31.

Portions, which are in the peel region 16 of the sheet member 20 and the film member 30 and are bonded together so as to be peelable from each other, are, for example, curved or warped and thus are put into close contact with each other by an inner pressure of the content C filling the container portion 14. Therefore, the content C is prevented with more certainty from leaking.

The portions of the sheet member 20 and the film member 30, which are in the peel region 16 and are bonded together so as to be peelable from each other, are easily peel-opened against the adhesive layer N1 by merely folding the peel-openable package 10A. Therefore, the portions of the sheet member 20 and the film member 30, that are bonded together so as to be peelable from each other, are not likely to be left partially unpeeled. The content C is taken out with no obstruction.

In a region other than the peel region 16, the facing surfaces of the sheet member 20 and the film member 30 are bonded together by the adhesive layer N2 so as not to be peelable from each other. Therefore, in the region other than the peel region 16, the sheet member 20 and the film member 30 are prevented with certainty from being peeled off from each other.

Therefore, the content C is prevented from leaking through the region other than the peel region 16 corresponding to the area between the cutouts 21 and 31.

When being released from the folded state, the peel-openable package 10A is recovered to the pre-folding state because of the recovery force of the peel-openable package 10A itself. Therefore, the peel-opened portion in the peel region 16 of the sheet member 20 and the film member 30 is sealed again by the adhesive layer N1, and the content C is kept non-leaked until the peel-openable package 10A is peel-opened again.

Thus, even if the peel-openable package 10A is fallen such that, for example, the front surface thereof is vertical or directed downward, leaking of the content C is suppressed to a minimum possible level.

Hereinafter, other examples of the peel-openable package 10A will be described. In the following description, elements same or equivalent to those described above will bear the same reference signs and will not be described in detail.

Example 2

In example 1, the cutouts 21 and 31 have the same length as each other. In example 2, the cutouts 21 and 31 of the peel-openable package 10A have different lengths from each other as shown in FIGS. 5A and 5B.

Figure 5A:
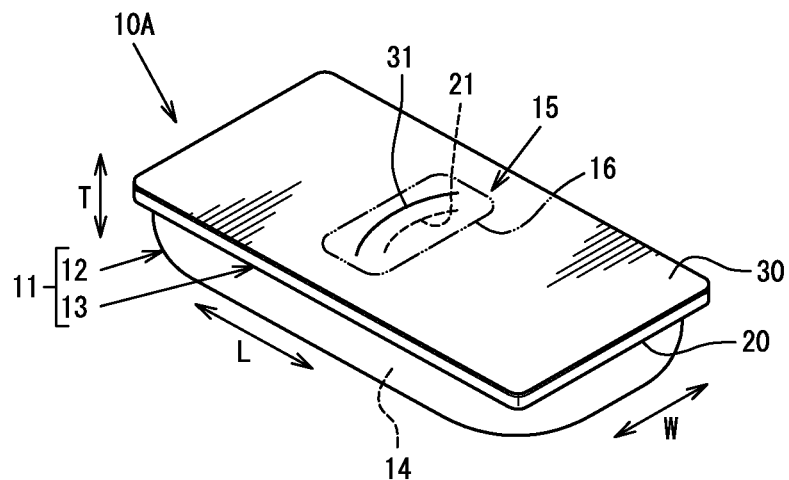
FIGS. 5A and 5B show a peel-openable package in example 2 including an opening structure.
Figure 5B:
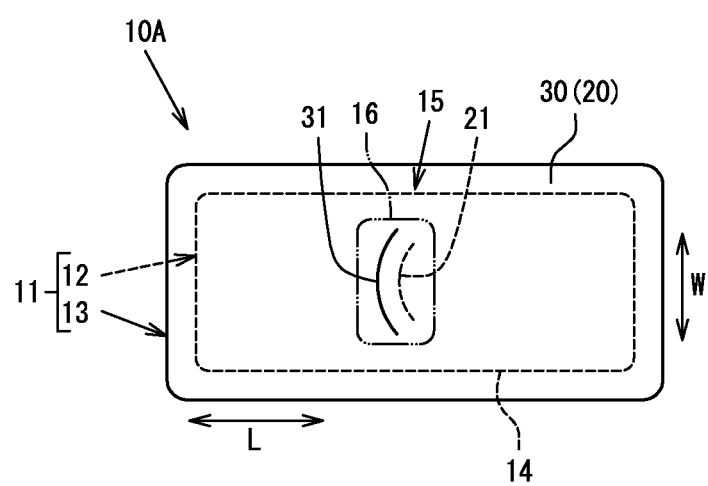

FIGS. 5A and 5B show the peel-openable package 10A in example 2 having an opening structure. In more detail, FIG. 5A is a perspective view of the peel-openable package 10A as seen from above, and FIG. 5B is a plan view of the peel-openable package 10A as seen from the front side thereof.

In the peel-openable package 10A in example 2, the cutout 31 in the film member 30 is longer than the cutout 21 in the sheet member 20. Therefore, when the peel-openable package 10A is folded into two along the foldable portion 15, the level of displacement in the folding direction G caused to the portions of the sheet member 20 and the film member 30 that are bonded together so as to be peelable from each other, is larger.

In the case where the cutouts 21 and 31 have different lengths, the cutouts 21 and 31 are formed into openings having different sizes, unlike in the case where the cutouts 21 and 31 have the same length. Therefore, the portions of the sheet member 20 and the film member 30, which in the peel region 16 corresponding to the area between the cutouts 21 and 31 and are bonded together so as to be peelable from each other, are peel-openable more simply and more easily.

As a result, the function and the effect substantially equivalent to, or greater than, those in example 1 are provided.

Opposite to the above, the cutout 21 may be longer than the cutout 31. The function and the effect substantially equivalent to those in example 1 are provided.

Figure 6A:
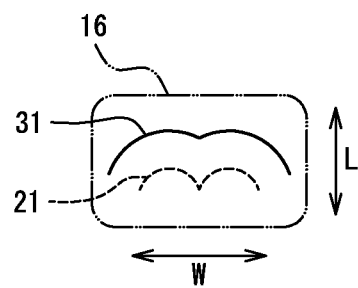
FIGS. 6A, 6B, and 6C show an example in which cutouts have different lengths and shapes from each other.
Figure 6B:
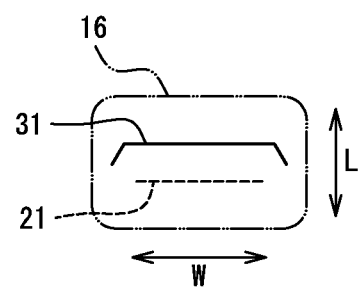
Figure 6C:
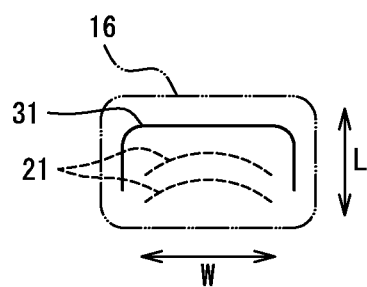

FIGS. 6A, 6B, and 6C show other examples of the cutouts 21 and 31 having different lengths. For example, in the case where the cutout 31 has two peaks and the cutout 21 has the same shape thereto, the cutout 31 may be longer than the cutout 21 (see FIG. 6A). In the case where the cutout 31 is trapezoidal and the cutout 21 is linear, the cutout 31 may be longer than the cutout 21 (see FIG. 6B). In the case where the cutout 31 is inverted U-shaped and two cutouts 21 are both arcked, the cutout 31 may be longer than each of the cutouts 21 (see FIG. 6C).

In example 1, the cutouts 21 and 31 have the same shape as each other. FIGS. 6B and 6C show examples in which the cutouts 21 and 31 have different shapes from each other.

FIGS. 6A, 6B, and 6C show such examples in which the cutouts 21 and 31 have different lengths or different shapes from each other.

This will be described in more detail. In the case where the cutouts 21 and 31 have the same shape, substantially the same level of displacement is caused in the folding direction G to the portions of the sheet member 20 and the film member 30, which are in the peel region 16 and are bonded together so as to be peelable from each other. Therefore, the portions of the sheet member 20 and the film member 30, that are bonded together so as to be peelable from each other, are peel-opened substantially equally.

By contrast, in the case where the cutouts 21 and 31 have different shapes, different levels of displacement are caused in the folding direction G to the portions of the sheet member 20 and the film member 30, that are bonded together so as to be peelable from each other (see FIGS. 6B and 6C).

Specifically, in FIG. 6B, the cutout 31 is trapezoidal, and the cutout 21 is linear. In FIG. 6C, the cutout 31 is inverted U-shaped, and the cutouts 21 are arcked.

In the case where the cutouts 21 and 31 have different shapes, the portions of the sheet member 20 and the film member 30, which are in the peel region 16 corresponding to the area between the cutouts 21 and 31 and are bonded together so as to be peelable from each other, are peel-opened more simply and more easily than in the case where the cutouts 21 and 31 have the same shape. Therefore, the function and the effect substantially equivalent to, or greater than, those in example 1 are provided.

The length and the shape of the cutouts 21 and 31 are not limited to those described in examples 1 and 2. A plurality of types of cutouts 21 and 31 different in the length or the shape may be combined.

Example 3

In examples 1 and 2, the cutouts 21 and 31 are slits. In example 3, as shown in FIGS. 7 and 8, the cutouts 21 and 31 of the peel-openable package 10A are each provided in the form of a perforation.

Figure 7A:
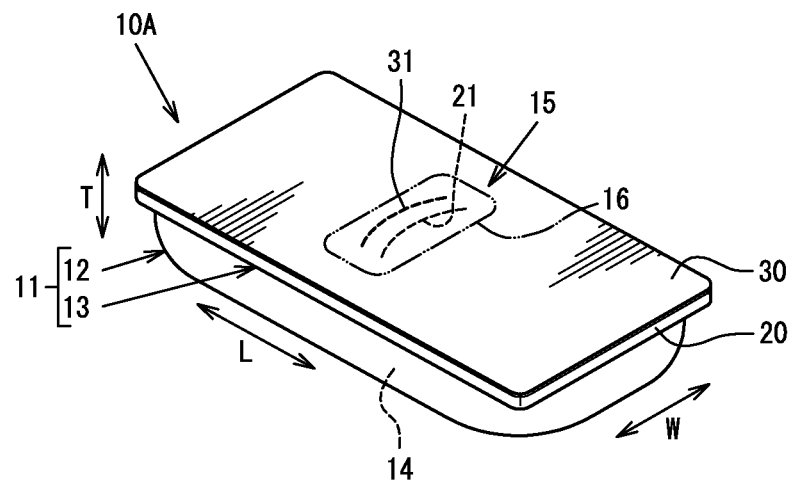
FIGS. 7A and 7B show a peel-openable package in example 3 including cutouts provided in the form of perforations.
Figure 7B:
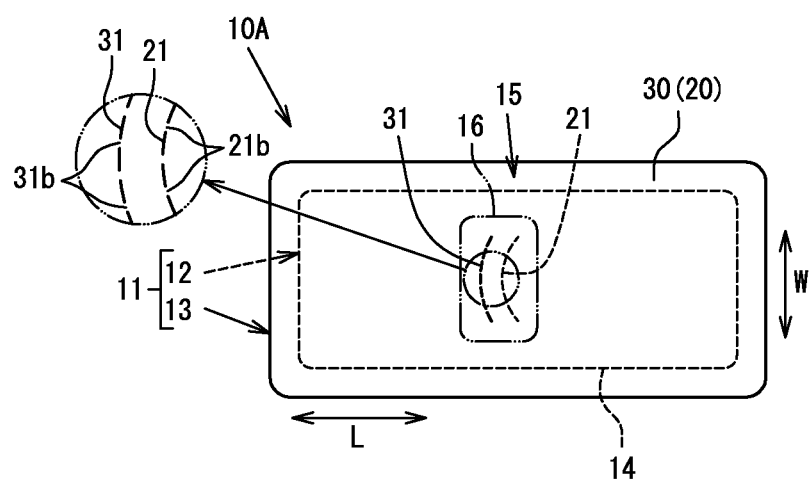

FIGS. 7A and 7B show the peel-openable package 10A in example 3 including the cutouts 21 and 31 each provided in the form of a perforation.

The cutouts 21 and 31 respectively include a plurality of holes 21b and 31b running in the thickness direction T of the sheet member 20 and the film member 30. The holes 21b and the hole 31b are arrayed in perforations extending in the width direction W perpendicular to the longitudinal direction L.

When the peel-openable package 10A in example 3 is folded into two, areas between adjacent holes 21b of the cutout 21, and areas between adjacent holes 31b of the cutout 31, are peeled off or broken. Therefore, the holes 21b are made continuous to each other, and the holes 31b are made continuous to each other.

Thus, like in the case of the cutouts 21 and 31 in examples 1 and 2, the portions in the sheet member 20 and the film member 30, which are in the peel region 16 corresponding to the area between the cutouts 21 and 31 and are bonded together so as to be peelable from each other, are peel-opened simply and easily.

As a result, the function and the effect substantially equivalent to, or greater than, those in examples 1 and 2 are provided. Until the areas between the adjacent holes 21b and 31b are broken, the content C is kept non-leaked.

Example 4

In examples 1 and 2, the peel-openable package 10A is folded into two along the foldable portion 15. In the peel-openable package 10A in example 4, as shown in FIGS. 8A and 8B, straight folding lines 25 assisting folding of the sheet member 20 is provided.

Figure 8A:
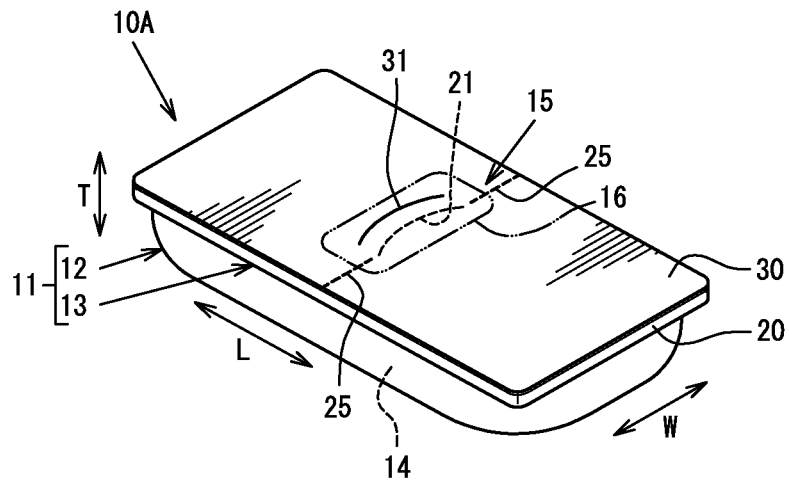
FIGS. 8A and 8B show a peel-openable package in example 4 including folding lines.
Figure 8B:
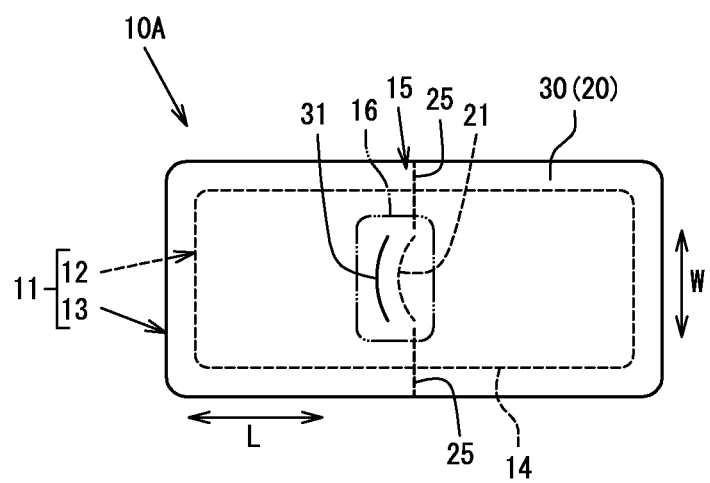

FIGS. 8A and 8B show the peel-openable package 10A in example 4 including the folding lines 25. In more detail, FIG. 8A is a perspective view of the peel-openable package 10A as seen from above, and FIG. 8B is a plan view of the peel-openable package 10A as seen from the front side thereof.

The folding lines 25 are provided between both of two ends, in the width direction W, of the sheet member 20 and both of two ends, in the width direction W, of the cutout 21. The folding lines 25 extend in the width direction W perpendicular to the longitudinal direction L of the sheet member 20.

When the peel-openable package 10A in example 4 is folded into two, the folding is assisted by the folding lines 25 provided in the sheet member 20. Therefore, the resistance of the sheet member 20 against the folding is decreased at the time when the peel-openable package 10A is folded into two.

Thus, the peel-openable package 10A is folded into two more accurately and more easily. In addition, the portions of the sheet member 20 and the film member 30, which are in the peel region 16 corresponding to the area between the cutouts 21 and 31 and are bonded together so as to be peelable from each other, are peel-opened with more certainty.

As a result, the function and the effect substantially equivalent to, or greater than, those in examples 1 and 2 are provided. In addition, an error in the opening is prevented with certainty.

In example 4, the folding lines 25 extend in the width direction W perpendicular to the longitudinal direction L. In another example, as shown in FIGS. 9A and 9B, the folding lines 25 extend in an oblique direction with respect to the longitudinal direction L and the width direction W.

Figure 9A:
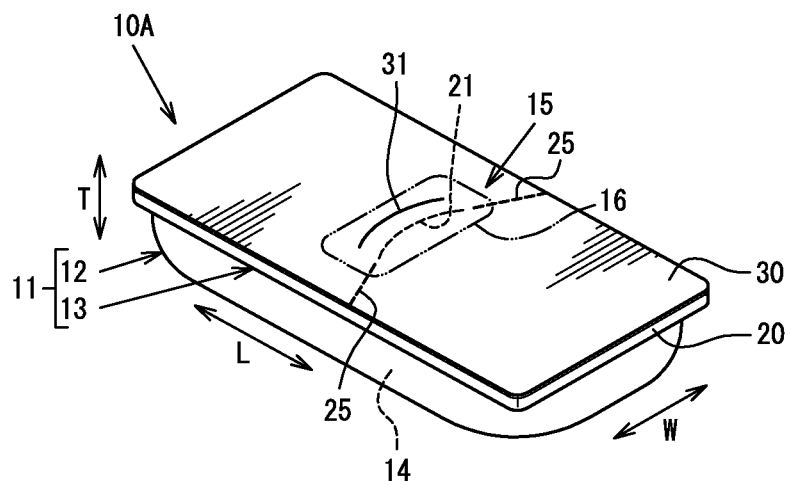
FIGS. 9A and 9B show an example in which the folding lines extend in an oblique direction.
Figure 9B:
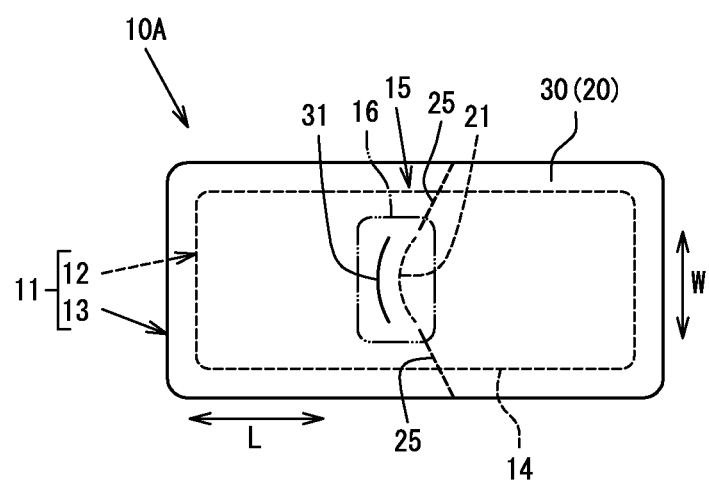

FIGS. 9A and 9B show the example in which the folding lines 25 extend obliquely. In more detail, FIGS. 9A and 9B show a perspective view of the peel-openable package 10A as seen from above, and FIG. 9B is a plan view of the peel-openable package 10A as seen from the front side thereof.

The folding lines 25 are provided between both of two ends, in the width direction W, of the sheet member 20 and both of two ends, in the width direction W, of the cutout 21. The folding lines 25 extend obliquely, namely, at a predetermined angle, with respect to the longitudinal direction L and the width direction W.

When the peel-openable package 10A is folded into two, the foldable portion 15 is deformed to be warped. Therefore, the portions of the sheet member 20 and the film member 30, which are in the region corresponding to the area between the cutouts 21 and 31 and are bonded together so as to be peelable from each other, are peel-opened with more certainty.

As a result, the function and the effect substantially equivalent to, or greater than, those in examples 1 and 2 are provided. The folding lines 25 may extend in, for example, a smooth curved line, for example, in an arcked line or the like.

Example 5

The peel-openable package 10A in each of examples 1 through 4 includes one cutout 21 and one cutout 31. The peel-openable package 10A in example 5 includes two cutouts 21 and two cutouts 31.

Figure 10A:
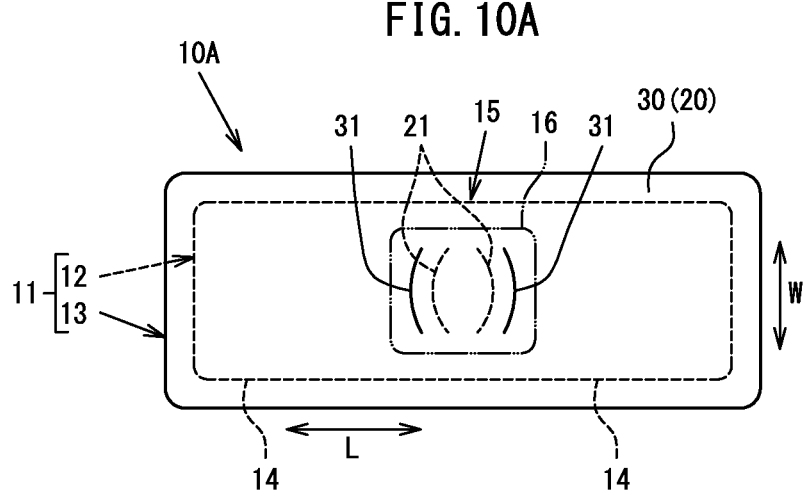
FIGS. 10A, 10B, and 10C show a peel-openable package in example 5 including the cutouts at two positions for each.
Figure 10B:
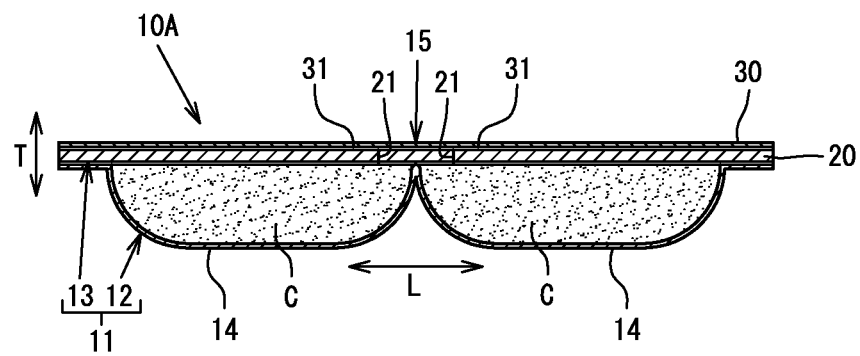
Figure 10C:
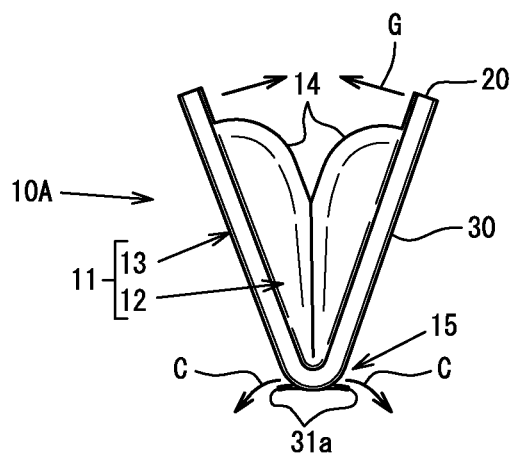

FIGS. 10A and 10B show the peel-openable package 10A in example 5 including two cutouts 21 and two cutouts 31. In more detail, FIG. 10A is a plan view of the peel-openable package 10A as seen from the front side thereof. FIG. 10B is a cross-sectional view of the peel-openable package 10A taken along a center line thereof in the width direction W. FIG. 10C is a side view of the peel-openable package 10A in a state of being folded into two.

In the peel-openable package 10A in example 5, two cutouts 21 having an arcked shape are provided line-symmetrically, and also two cutouts 31 having an arcked shape are provided line-symmetrically, with respect to a phantom reference line (not shown) set in the foldable portion 15. The phantom reference line is parallel to the width direction W. The peel-openable package 10A includes two container portions 14 accommodating two types of contents C individually. The two container portions 14 are provided in correspondence with the two cutouts 21 and the two cutouts 31 (see FIGS. 10A and 10B).

When the peel-openable package 10A in example 5 is folded into two in order to take out the contents C from the peel-openable package 10A, the following occurs. The portions of the sheet member 20 and the film member 30, which are in the peel region 16 corresponding to the area between one sets of cutout 21 and the cutout 31 and are bonded together so as to be peelable from each other, and the portions of the sheet member 20 and the film member 30, which are in the peel region 16 corresponding to the area between the other set of the cutout 21 and the cutout 31 and are bonded together so as to be peelable from each other, are peel-opened substantially at the same time against the adhesive force of the adhesive layer N1 (see FIGS. 10B and 10C).

Thus, the two cutouts 21 and the two cutouts 31 are respectively put into communication with the two container portions 14 enclosing the contents C, and the two cutouts 21 and the two cutouts 31 are formed into the openings having such a size and a shape as to allow the contents C filling the container portions 14 to be taken out.

As a result, the contents C filling the container portions 14 are taken out substantially at the same time through the openings formed at two positions. Therefore, the function and the effect substantially equivalent to, or greater than, those in examples 1 and 2 are provided.

Example 6

In example 5, the two arcked cutouts 21 and the two arcked cutouts 31 are located line-symmetrically. In the peel-openable package 10A in example 6, as shown in FIGS. 11A, 11B, and 11C, two cutouts 31 having a linear shape are provided line-symmetrically with respect to the cutout 21 having a linear shape.

Figure 11A:
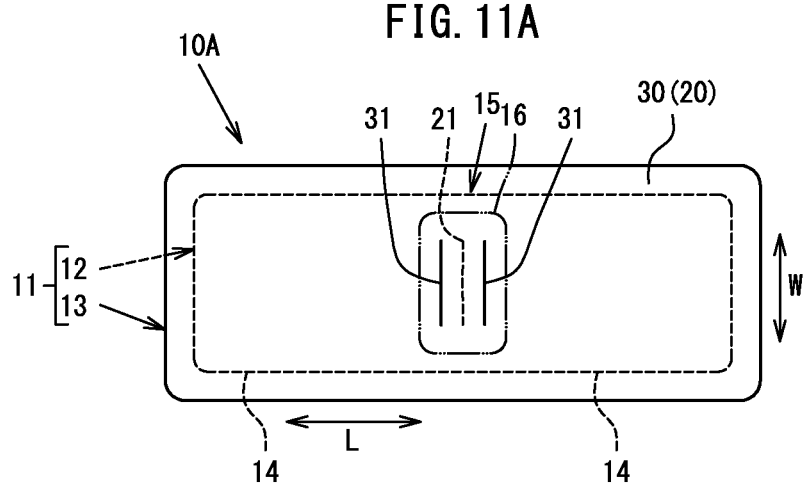
FIGS. 11A, 11B, and 11C show a peel-openable package in example 6 in which one of two types of cutouts is provided symmetrically.
Figure 11B:
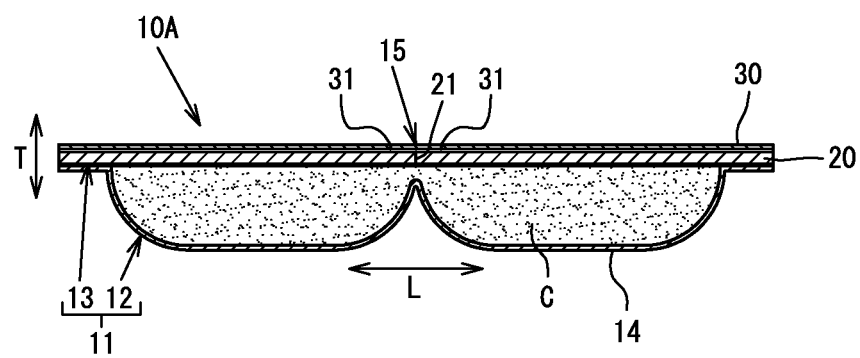
Figure 11C:
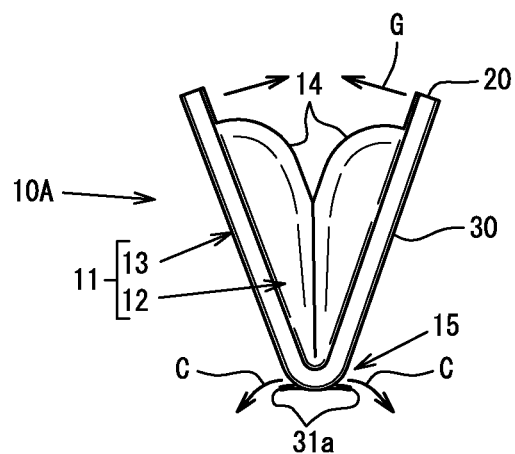

FIGS. 11A, 11B, and 11C show the peel-openable package 10A in example 6 including two cutouts 31 provided line-symmetrically. In more detail, FIG. 11A is a plan view of the peel-openable package 10A as seen from the front side thereof. FIG. 11B is a cross-sectional view of the peel-openable package 10A taken along a center line thereof in the width direction W. FIG. 11C is a side view of the peel-openable package 10A in a state of being folded into two.

In the peel-openable package 10A in example 6, two linear cutouts 31 are provided on both of two sides of the linear cutout 21, which is provided in a central portion, in the width direction W, of the foldable portion 15. The cutouts 31 are away from the cutout 21 by a predetermined interval, which extends in the longitudinal direction L. The cutouts 21 and 31 extend in a direction parallel to the width direction W (FIGS. 11A and 11B).

When the peel-openable package 10A in example 6 is folded into two in order to take out the content C from the peel-openable package 10A, the following occurs. The portions of the sheet member 20 and the film member 30, which are in the peel region 16 corresponding to the area between the cutout 21 and one of the two cutouts 31 and are bonded together so as to be peelable from each other, and portions of the sheet member 20 and the film member 30, which are in the peel region 16 corresponding to the area between the cutout 21 and the other cutout 31 and are bonded together so as to be peelable from each other, are peel-opened substantially at the same time against the adhesive force of the adhesive layer N1 (see FIG. 11C).

Although the cutouts 21 and 31 are linear, the sheet member 20 is thicker than the film member 30. Therefore, the thickness of the sheet member 20 is used, so that the portions of the sheet member 20 and the film member 30, that correspond to the areas between the cutouts 21 and 31 formed in the sheet member 20 and the film member 30 and are bonded together so as to be peelable from each other, are pulled against the adhesive force of the adhesive layer N1. Thus, the peel-openable package 10A is peeled-opened.

As a result, the one cutout 21 and the two cutouts 31 are put into communication with one container portion 14 enclosing the content C. Therefore, the function and the effect substantially equivalent to those in example 5 are provided.

The cutouts 21 and 31 are not limited to having a linear shape, and may be arced or have any other shape. A plurality of the cutouts 21 and a plurality of cutouts 31 may be located to extend in the width direction W.

In examples 1 through 6, the container portion 14 is provided on the main body portion 12 side. In another example of the peel-openable package 10A, as shown in FIGS. 12A, 12B, and 12C, either one of, or both of, the main body portion 12 and the lid 13 included in the peel-openable package 10A are formed to have a generally U-shaped cross-section to provide the container portion 14 enclosing the content C.

Figure 12A:
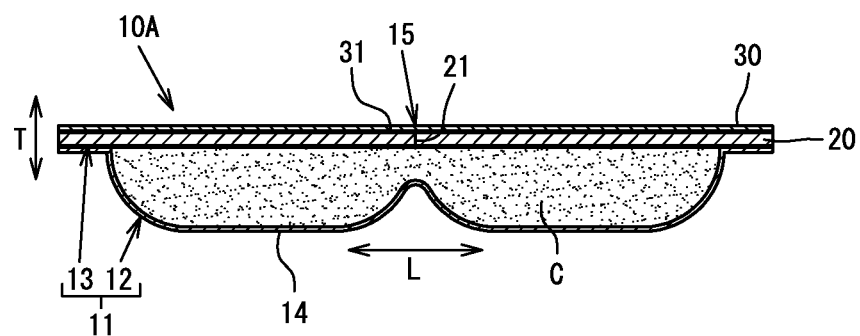
FIGS. 12A, 12B, and 12C show a peel-openable package in which a container portion is provided in one of, or both of, a main body portion and a lid.
Figure 12B:
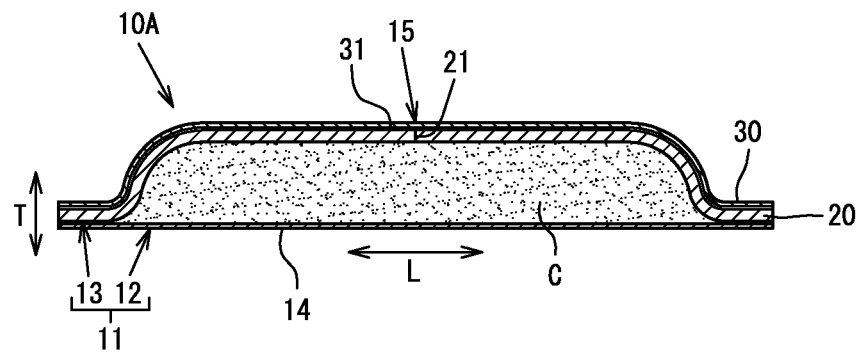
Figure 12C:
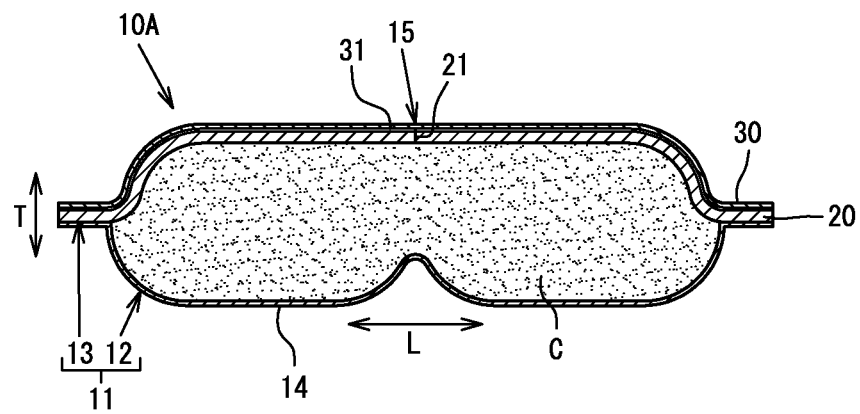

FIGS. 12A, 12B, and 12C show the example in which the container 14 is provided in one of, or both of, the main body portion 12 and the lid 13.

In the peel-openable package 10A in each of examples 1 through 6, the main body portion 12 is formed to have a generally U-shaped cross-section and the main body portion 12 is provided on the main body portion 12 side (see FIG. 12A). Alternatively, the sheet member 20 in the lid 13 may be formed to have a generally U-shaped cross-section, so that the container portion 14 is provided on the lid 13 side (see FIG. 12B).

Still alternatively, the sheet member 20 in the lid 13 and the film in the main body portion 12 may be formed to have a generally U-shaped cross-section, so that the container portion 14 is provided between the main body portion 12 and the lid 13 (FIG. 12C).

When the peel-openable package 10A is folded into two, the portions of the sheet member 20 and the film member 30, which are in the peel region 16 corresponding to the area between the cutouts 21 and 31 and are bonded together so as to be peelable from each other, are peel-opened. Therefore, the function and the effect substantially equivalent to those in examples 1 through 6 are provided.

Example 7

In the peel-openable package 10A in each of examples 1 through 6, the peripheral portions of the sheet member 20 and the film member 30 are thermally welded to each other. In the peel-openable package 10A in example 7, as shown in FIGS. 13A and 13B, the sheet member 20 is located inner to the film member 30, and the peripheral portions of the film member 30 outer to the sheet member 20 are thermally welded to each other.

Figure 13A:
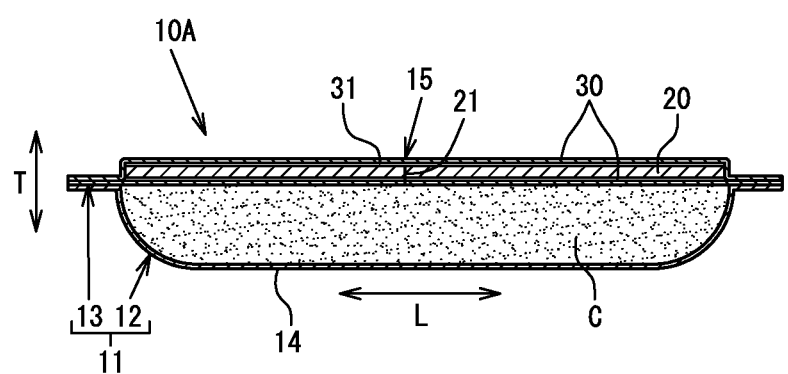
FIGS. 13A and 13B show a peel-openable package in example 7 including an opening structure.
Figure 13B:
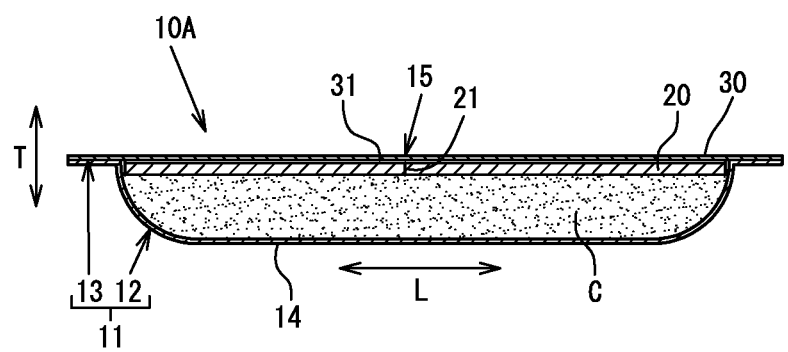

FIGS. 13A and 13B show the peel-openable package 10A in example 7 having an opening structure. In more detail, FIG. 13A is a cross-sectional view of an opening structure in which the sheet member 20 is held between a pair of film members 30. FIG. 13B is a cross-sectional view of an opening structure in which the sheet member 20 is bonded to a surface of the film member 30, the surface facing the container portion 14.

The peel-openable package 10A in example 7 is produced as follows. The sheet member 20 is held between the pair of film members 30, and then peripheral portions of the pair of film members 30 that are outer to the sheet member 20 are thermally welded to provide a sealing. The peripheral portions of the film members 30 are thinner than the sheet member 20. Such thin portions are thermally welded at a higher speed than thick members to provide a package (see FIG. 13A).

Alternatively, the peel-openable package 10A may be produced as follows. The sheet member 20 is bonded to the surface of the film member 30 that faces the container portion 14, and then a rear surface of the peripheral portion of the film member 30 that is outer to the sheet member 20 is thermally welded to a front surface of a peripheral portion of the main body portion 12 formed of a synthetic resin film to provide a sealing. The peripheral portion of the film member 30 and the peripheral portion of the main body portion 12, which are thinner than the sheet member 20, are thermally welded at a high speed provide a package (see FIG. 13B).

The time required to thermally weld and seal the thin peripheral portions of the film members 30 is shorter than the time required to thermally weld and seal thick peripheral portions. In addition, the speed for packaging the content C, or the speed of the entire production process, may be set to be, for example, about 20% to 50% higher. Thus, the peel-openable package 10A is produced at lower cost.

Example 8

In the peel-openable package 10A in example 7, the sheet member 20 is bonded to the surface of the film member 30 that faces the container portion 14. In a peel-openable package 10B in example 8, as shown in FIGS. 14A and 14B, the sheet member 20 is bonded to a surface of one of a pair of film members 30, the surface facing the container portion 14.

Figure 14A:
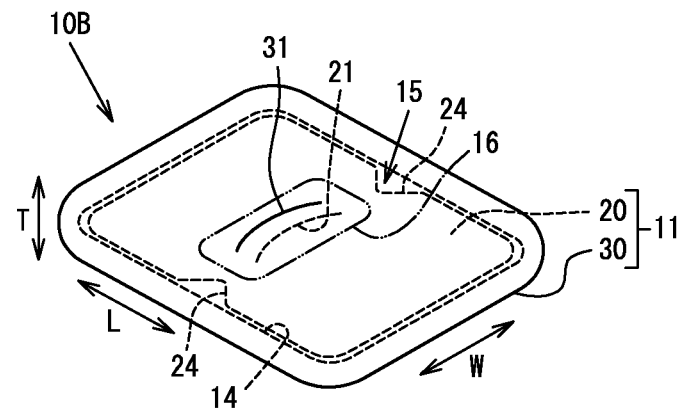
FIGS. 14A and 14B show a peel-openable package in example 8 including an opening structure.
Figure 14B:
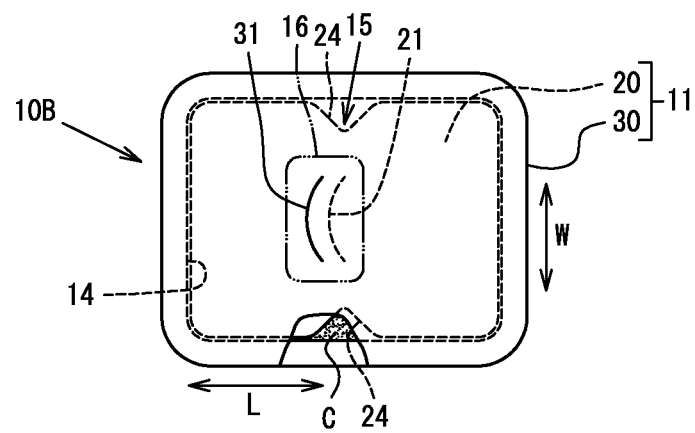

FIGS. 14A and 14B show the peel-openable package 10B in example 8 including an opening structure. In more detail, FIG. 14A is a perspective view of the peel-openable package 10B as seen from above, and FIG. 14B is a plan view of the peel-openable package 10B as seen from the front side thereof.

Figure 15A:
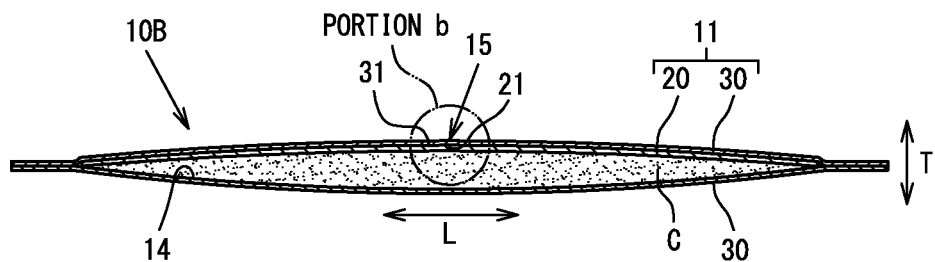
FIGS. 15A and 15B show a peel-openable package including an opening structure.
Figure 15B:
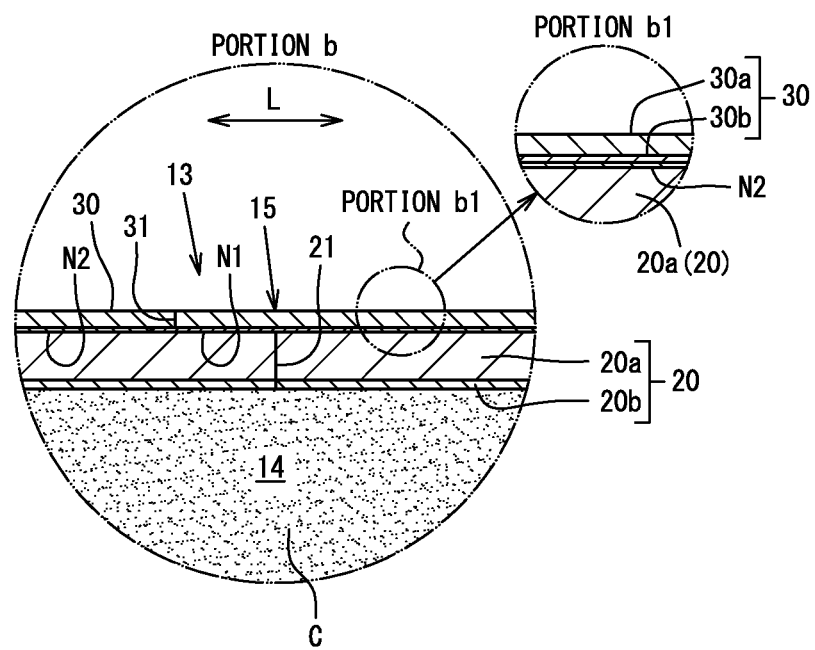

FIGS. 15A and 15B show the opening structure of the peel-openable package 10B. In more detail, FIG. 15A is a cross-sectional view of the peel-openable package 10B taken along a center line in the width direction W, and FIG. 15B is an enlarged cross-sectional view of portion "b" shown in FIG. 15A. FIG. 15B also shows an enlarged cross-sectional view of portion "b1" in a small two-dot chain line circle.

Figure 16A:
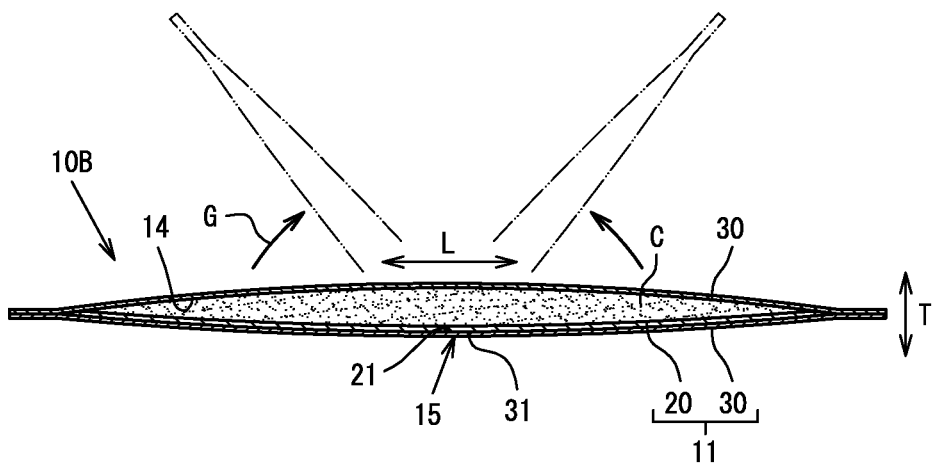
FIGS. 16A and 16B show how to take out the content from the peel-openable package.
Figure 16B:
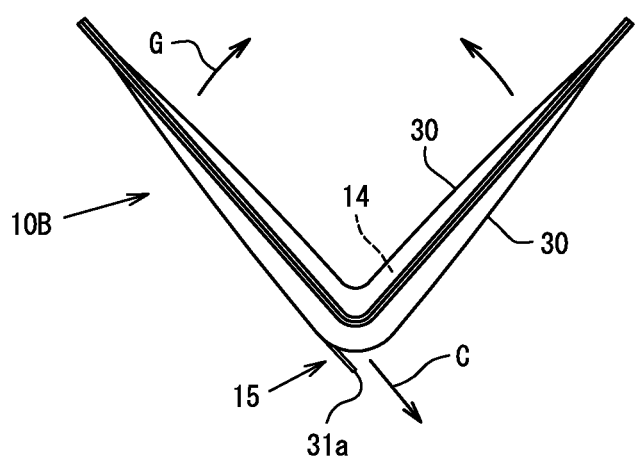

FIGS. 16A and 16B show how to take out the content C from the peel-openable package 10B. In more detail, FIG. 16A is a side view of the peel-openable package 10B in a state of starting to be folded, and FIG. 16B is a side view of the peel-openable package 10B in a state of being folded into two.

Figure 17:
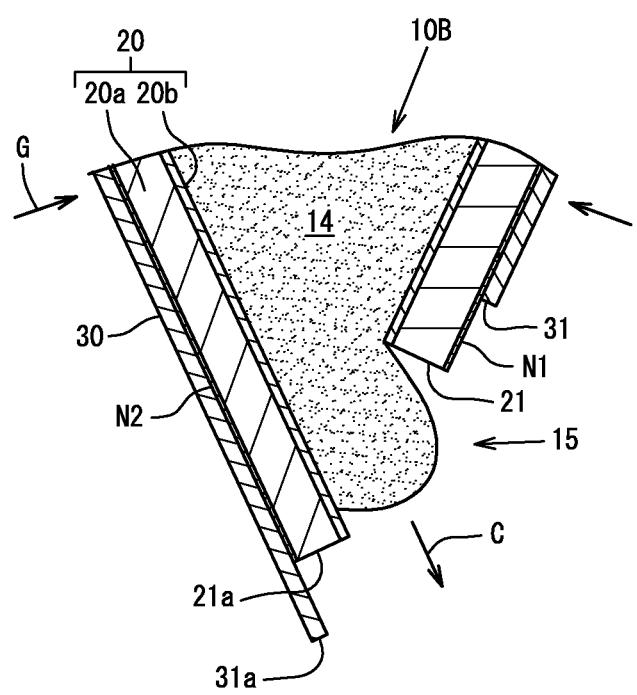
FIG. 17 is a partial enlarged cross-sectional view of FIG. 16 showing how to take out the content from the peel-openable package.

FIG. 17 is a partial enlarged cross-sectional view showing that the content C is being taken out from the peel-openable package 10B shown in FIGS. 16A and 16B.

In the peel-openable package 10B in example 8, the package main body 11 enclosing the content C is produced as follows. One of the pair of film members 30 has a surface to which the sheet member 20 is bonded. The film members 30 are located such that this surface is directed inward, and peripheral portions of the film members 30 that are outer to the sheet member 20 are thermally welded together. Between facing surfaces of the film members 30, the container portion 14 enclosing the content C is provided (see FIGS. 14A, 14B, 15A and 15B).

The sheet member 20 includes the foldable portion 15, along which the sheet member 20 is foldable, in a central portion thereof in the longitudinal direction L. The peel region 16 represented by the two-dot chain line in the figures is defined in a central portion, in the width direction W, of the foldable portion 15 (see FIGS. 14A and 14B).

The sheet member 20 and the film member 30 respectively include the cutouts 21 and 31 in the peel region 16. The cutouts 21 and 31 run in the thickness direction T (see FIGS. 15A and 15B).

At both of two ends, in the width direction W, of a portion of the sheet member 20 that corresponds to the foldable portion 15, recessed portions 24 are provided. The recessed portions 24 are recessed from the ends toward the center of the sheet member 20 in the width direction W (see FIGS. 14A and 14B).

When the peel-openable package 10B in example 8 is folded into two in order to take out the content C from the peel-openable package 10B, the portions of the sheet member 20 and the film member 30, which are in the peel region 16 corresponding to the area between the cutouts 21 and 31 and are bonded together so as to be peelable from each other, are peel-opened against the adhesive force of the adhesive layer N1 (see FIGS. 16A, 16B and 17).

As a result, the content C enclosed in the peel-openable package 10B is taken out smoothly through the peel-opened portion in the peel region 16 corresponding to the area between the cutouts 21 and 31 formed in the sheet member 20 and the film member 30. Therefore, the function and the effect substantially equivalent to those in example 1 are provided.

In addition, acute-angled portions of the peripheral portion of the sheet member 20 are covered with the flexible film members 30. Therefore, when the sheet member 20 is, for example, nipped with fingers to be folded, the fingers are prevented from being injured, and the pain felt at the time of folding is alleviated. The sheet member 20, when being touched with the fingers, provides a good feel.

In addition, the width of the foldable portion 15 in the sheet member 20 is narrower than the width of the remaining portion by the recessed portions 24. Therefore, the rigidity of the foldable portion 15 is weaker than the remaining portion, and thus the peel-openable package 10B is folded easily.

The recessed portion 24 may be provided at least at one of the two ends, in the width direction W, of the sheet member 20.

In examples 1 through 8, the cutouts 21 and 31 are arcked. Alternatively, the cutouts 21 and 31 may have any of other desirable shapes as shown in FIGS. 18A-18H.

FIGS. 18A-18H show the examples in which the cutouts 21 and 31 have other desirable shapes.

This will be described in more detail. The cutouts 21 and 31 may be linear as shown in FIG. 18A, may be wave-shaped as shown in FIG. 18B, may have two peaks as shown in FIG. 18C, may be trapezoidal as shown in FIG. 18D, may be inverted U-shaped as shown in FIG. 18E, may be M-shaped as shown in FIG. 18F, may be inverted V-shaped (or triangular) as shown in FIG. 18E, or may have any other desirable shape.

Alternatively, as shown in FIG. 18H, the cutouts 21 and 31 may each be cut into a plurality of portions. In this case, the area between adjacent cutout portions have such a length as to be peeled off or broken.

The arcked shape described in example 1 through 8 and any shape selected from the shapes shown in FIG. 18A through FIG. 18H may be combined to form the cutouts 21 and 31 in the sheet member 20 and the film member 30. In this case also, the function and the effect substantially equivalent to, or greater than, those in examples 1 through 8 are provided.

Figure 19:
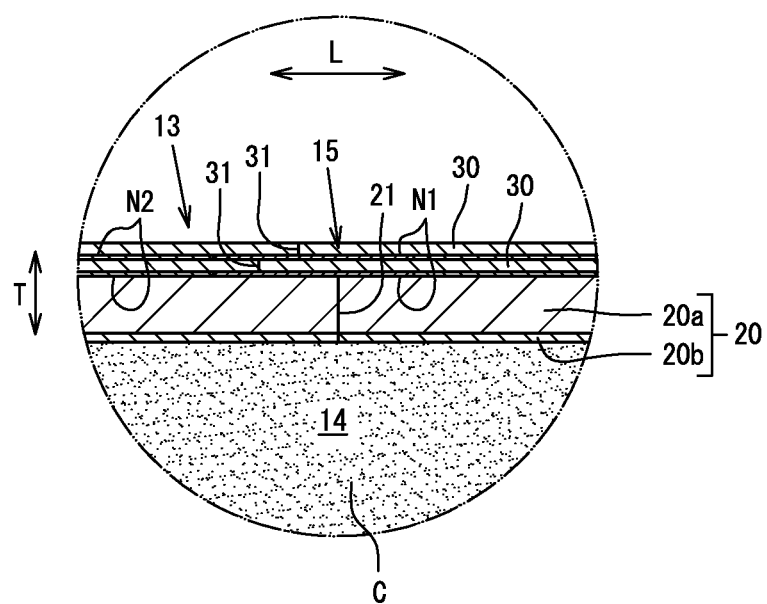
FIG. 19 is an enlarged cross-sectional view of a foldable portion of an opening structure having a three-layer structure.

In examples 1 through 8, the opening structure has a two-layer structure including the sheet member 20 and the film member 30 bonded together. As shown in FIG. 19, the opening structure may have a three-layer structure including one sheet member 20 and two film members 30 bonded to the front surface of the sheet member 20.

FIG. 19 is an enlarged cross-sectional view of the foldable portion 15 in the opening structure having such a three-layer structure.

The opening structure having the three-layer structure is produced as follows. A first-layer film member 30 is bonded on the sheet member 20. On a front surface of the first-layer film member 30, a second-layer film member 30 having such a size and such a shape as to cover the entirety of a surface of the first-layer film member 30 is bonded to provide an integral three-layer structure. In the second-layer film member 30, a cutout portion 31 running in the thickness direction T is formed at an approximately middle position between the cutout 21 in the sheet member 20 and the cutout 31 in the first-layer film member 30.

In the case of the opening structure having the above-described three-layer structure, when the sheet member 20 is folded into two, the portions of the sheet member 20 and the film member 30, which correspond to the area between the cutout 21 and one of the cutouts 31 and are bonded together so as to be peelable from each other, and the portions of the sheet member 20 and the film member 30, which correspond to the area between the cutout 21 and the other cutout 31 and are bonded together so as to be peelable from each other, are peel-opened against the adhesive force of the adhesive layer N1.

Now, it is assumed that the portions of the sheet member 20 and one of the film members 30, which correspond to the area between the cutout 21 and the cutout 31 and are bonded together so as to be peelable from each other, and the portions of the sheet member 20 and the other film member 30, which correspond to the area between the cutout 21 and the cutout 31 and are bonded together so as to be peelable from each other, are peeled from each other in a non-open state. Even in this case, the cutout 31 in the first-layer film member 30 is covered with the second-layer film member 30. Therefore, the content C filling the container portion 14 is prevented with certainty from leaking.

The opening structure having the three-layer structure is applicable to the peel-openable packages 10A and 10B in examples 1 through 9. A plurality of the film members 30, for example, three or four film members 30 may be used as long as such film members 30 are peel-openable.

Example 9

In examples 1 through 8, the peel-openable packages 10A and 10B are peel-opened by the folding force of the fingers. The peel-openable package 10A in example 9 is peel-opened by an increased folding force provided by the principle of leverage as shown in FIGS. 20A, 20B, and 20C.

Figure 20A:
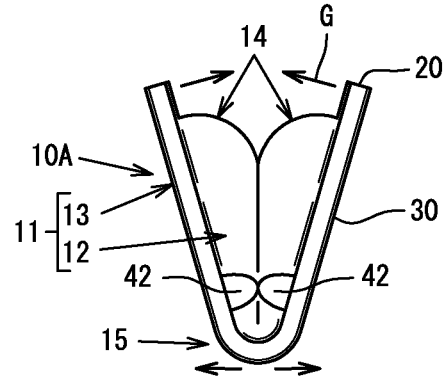
FIGS. 20A, 20B, and 20C show a peel-openable package in example 9 including a protruding portion.
Figure 20B:
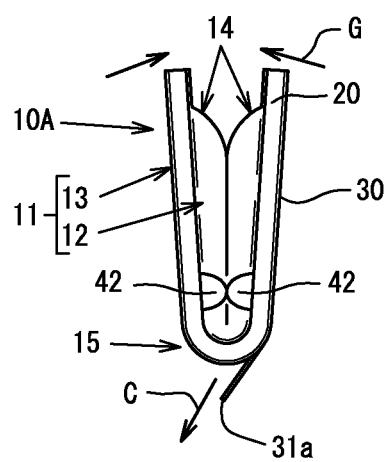
Figure 20C:
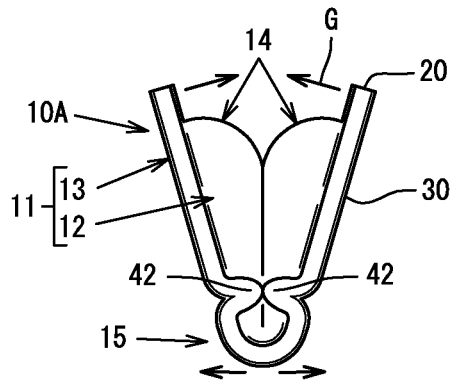

FIGS. 20A, 20B, and 20C show the peel-openable package 10A in example 9 including protrusion portions 42. In more detail, FIG. 20A is a side view of the peel-openable package 10A in a state of being folded while the protrusion portions 42 are in contact with each other. FIG. 20B is a side view of the peel-openable package 10A in a peel-opened state. FIG. 20C is a side view of another example of the peel-openable package 10A in a state of being folded while the protrusion portions 42 are in contact with each other.

In the peel-openable package 10A in example 9, two protrusion portions 42 are located at positions, of the sheet member 20, facing each other in the folding direction G, so as to be in contact with each other when the peel-openable package 10A is folded into two (see FIG. 20A).

The point at which the protrusion portions 42 are in contact with each other acts as the fulcrum. A folding force is applied to a loose end of the peel-openable package 10A that corresponds to the point of effort, and as a result, a large tensile force is applied to the foldable portion 15 corresponding to the point of action by the principle of leverage (see FIG. 20A).

In this manner, even if the folding force applied to the point of effort of the peel-openable package 10A is small, the portions of the sheet member 20 and the film member 30, which correspond to the area between the cutouts 21 and 31 and are bonded together so as to be peelable from each other, are peel-opened more simply. Since the tensile force applied to the point of action is made larger, the peel-opening is performed still more simply (see FIG. 20B).

As a result, the portions of the sheet member 20 and the film member 30, which are in the peel region 16 corresponding to the area between the cutouts 21 and 31 and are bonded together so as to be peelable from each other, are opened more largely. Especially in the case where the content C is in the form of, for example, powder, granules, tablets or the like, the content C is taken out more easily.

The protrusion 42 may be formed by protruding a portion of the sheet member 20 that is close to the foldable portion 15 into the rear surface of the sheet member 20. Two such protrusions 42 may be provided on side ends of the rear surface of the sheet member 20 that are close to the foldable portion 15 (see FIG. 20C).

In example 9, two protrusion portions 42 are provided. Alternatively, one protrusion portion 42 may be provided at either one of the positions.

Example 10

In each of the peel-openable packages 10A and 10B in examples 1 through 9, the sheet member 20 has the same size and the same shape as those of the package main body 11. In a peel-openable package 10C (10C1, 10C2) in example 10, as shown in FIGS. 21A and 21B, the sheet member 20 is bonded to a front surface of the main body portion 12 of the package main body 11, and at least a portion 20X of the sheet member 20 protrudes outward from an edge of the main body portion 12.

Figure 21A:
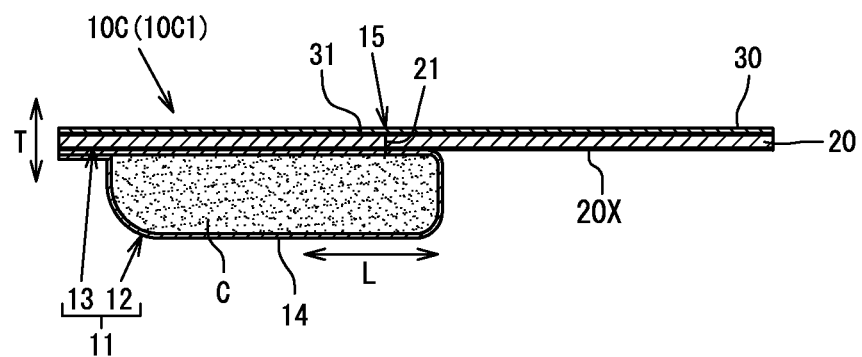
FIGS. 21A and 21B show a peel-openable package in example 10 including an opening structure.
Figure 21B:
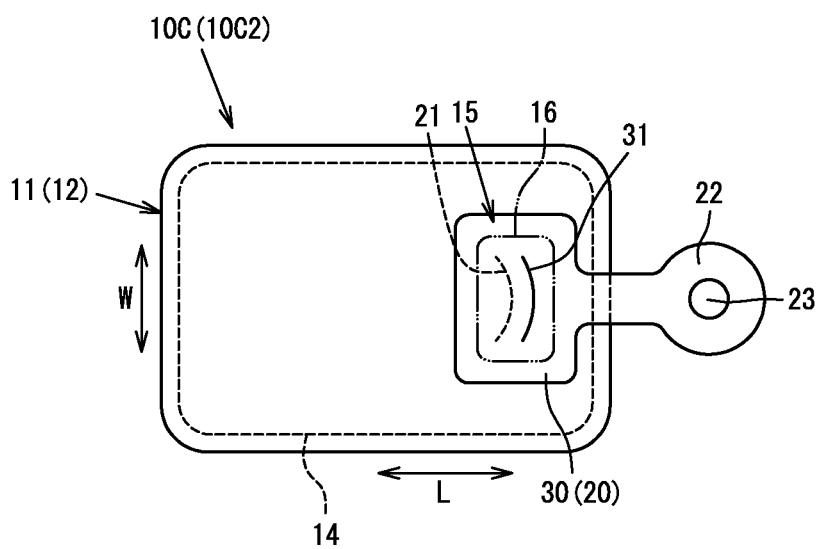

FIGS. 21A and 21B show the peel-openable package 10C in example 10 having an opening structure. In more detail, FIG. 21A is a cross-sectional view of a peel-openable package 10C1, in which the sheet member 20 having a generally rectangular shape as seen in a plan view is bonded to the front surface of the package main body 11, and the portion 20X of the sheet member 20 protrudes outward from the edge of the main body portion 12.

FIG. 21B is a plan view of a peel-openable package 10C2, in which the sheet member 20 having a generally T-shape as seen in a plan view is bonded to a portion of the front surface of the package main body 11, the portion being close to an edge of the package main body 11, and a suspending portion 22 continued from an edge of the sheet member 20 protrudes outward from the edge of the package main body 11.

The peel-openable package 10C1 is produced as follows. Edges of the package main body 11 excluding the edge corresponding to the portion 20X of the sheet member 20, namely, three edges of the package main body 11, are sealed by thermal welding. In the main body portion 12 in the package main body 11, the cutout 21 running in the thickness direction T is formed in the sheet member 20.

The peel-openable package 10C2 is produced as follows. Peripheral portions of a pair of film members 30 that are outer to the sheet member 20 are thermally welded to provide a sealing. In the main body portion 12 in the package main body 11, the cutout 21 running in the thickness direction T is formed in the sheet member 20. The suspending portion 22 continued from the sheet member 20 includes, for example, a hole 23 engageable with a hook or the like.

When the peel-openable package 10C (10C1, 10C2) having the above-described structure is folded into two, the portions of the sheet member 20 and the film member 30, which are in the peel region 16 corresponding to the area between the cutouts 21 and 31 and are bonded together so as to be peelable from each other, are peel-opened.

As a result, the content C enclosed in the peel-openable package 10C is taken out through the peel-opened portion corresponding to the area between the cutouts 21 and 31 formed in the sheet member 20 and the film member 30. Thus, the function and the effect substantially equivalent to those in examples 1 through 9 are provided.

In the peel-openable package 10C in example 10, the portion 20X of the sheet member 20 protrudes outward from an edge of the main body portion 12. Alternatively, the portion 20X of the sheet member 20 may extend to be substantially flush with the edge of the main body portion 12 or may extend to a position inner to the edge of the main body portion 12.

In examples 1 through 10, the peel-openable packages 10A, 10B and 10C including the opening structure in this embodiment according to the present invention each have a small capacity. Alternatively, the opening structure may be provided in each of large-capacity peel-openable packages 10G, 10H, 10I, 10J and 10K as shown in FIGS. 22A-22E.

FIGS. 22A-22E show the peel-openable packages 10G through 10K each having an opening structure. In more detail, FIG. 22A through FIG. 22E are front views of the peel-openable packages 10G through 10K each having an opening structure.

The peel-openable packages 10G through 10K shown in FIG. 22A through FIG. 22E each include a large-capacity package such as a package for liquid detergent, a package for hair washing liquid or the like commonly used. In a part of each of the peel-openable packages 10G through 10K, an opening structure in this embodiment including the cutouts 21 and 31 formed in the sheet member 20 and the film member 30 are provided.

Figure 22A:
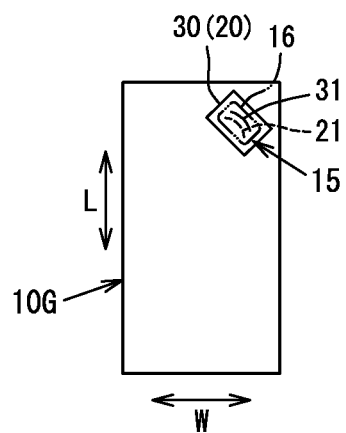
FIGS. 22A-22E show other examples of peel-openable package including an opening structure.
Figure 22B:
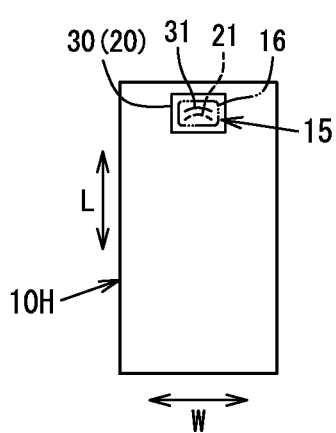
Figure 22C:
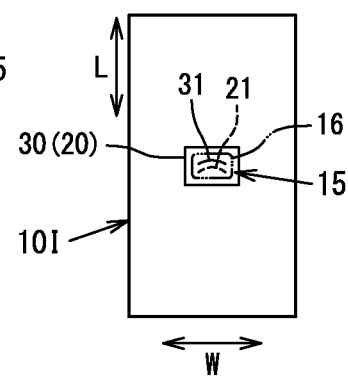

In FIG. 22A, the opening structure is provided in an acute-angled corner in a top right portion of the peel-openable package 10G. In FIG. 22B, the opening structure is provided in a top center portion of the peel-openable package 10H. In FIG. 22C, the opening structure is provided in a central portion, in the longitudinal direction L, of the peel-openable package 10I.

Figure 22D:
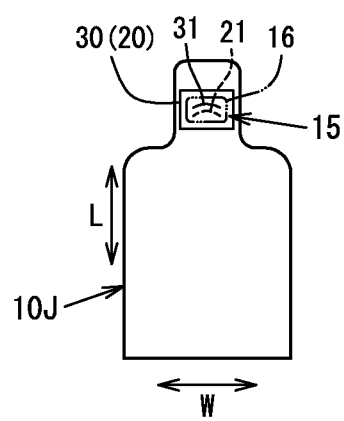
Figure 22E:
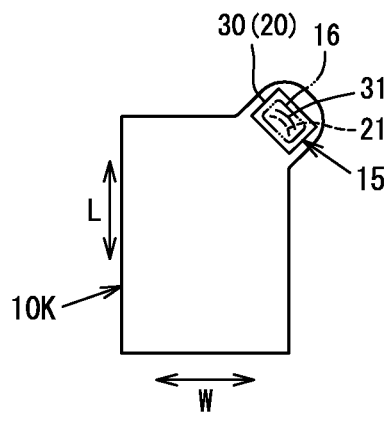

In FIG. 22D, the opening structure is provided in a portion protruding from a top center portion of the peel-openable package 10J. In FIG. 22E, the opening structure is provided in a portion protruding from a top right corner of the peel-openable package 10K.

Namely, the opening structure in this embodiment may be provided at any position inner to the perimeter of each of the peel-openable packages 10G through 10K. When each of the peel-openable packages 10G through 10K is folded into two, the portions of the sheet member 20 and the film member 30, which are in the peel region 16 corresponding to the area between the cutouts 21 and 31 and are bonded together so as to be peelable from each other, are peel-opened. Thus, the function and the effect substantially equivalent to those in examples 1 through 10 are provided.

Example 11

In the peel-openable packages 10A through 10C and 10G through 10K in examples 1 through 10, the facing surfaces of the sheet member 20 and the film member 30 in the peel region 16 are bonded together so as to be peelable from each other. In a peel-openable package 10D in example 11, as shown in FIGS. 23, 24A, and 24B, a sealing film 40 is provided between facing surfaces, in the peel region 16, of the sheet member 20 and the film member 30.

Figure 23:
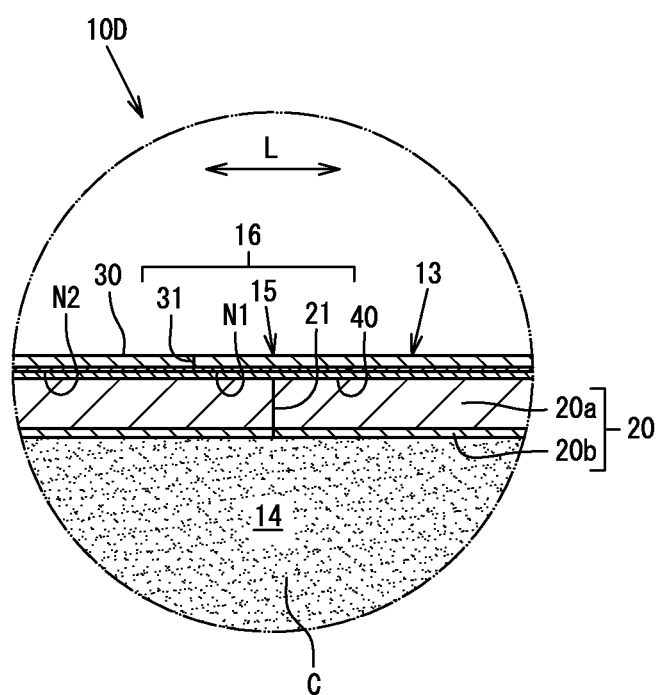
FIG. 23 shows a peel-openable package in example 11 including a sealing film.

FIG. 23 shows the peel-openable package 10D in example 11 including the sealing film 40. In more detail, FIG. 23 is an enlarged cross-sectional view of the foldable portion 15 of the peel-openable package 10D, in which the sealing film 40 is provided between the facing surfaces, in the peel region 16, of the sheet member 20 and the film member 30.

Figure 24A:
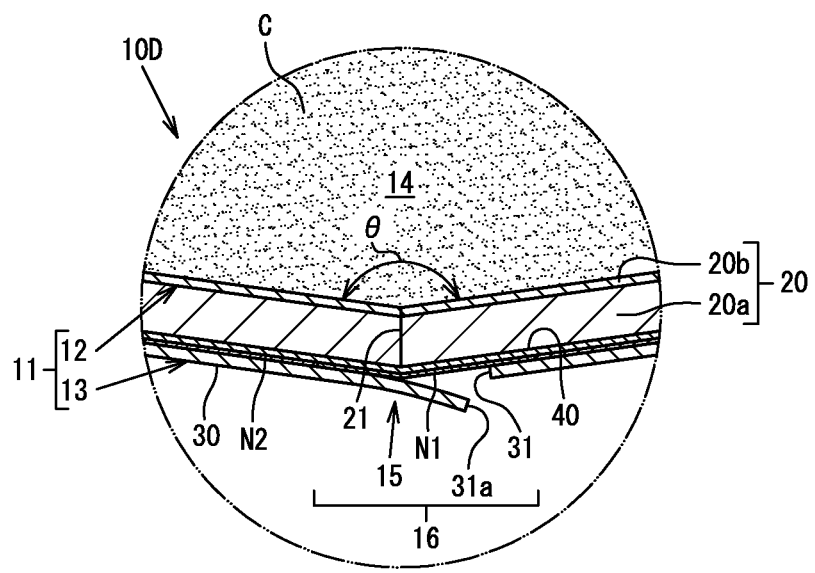
FIGS. 24A and 24B show how to take out the content from the peel-openable package.
Figure 24B:
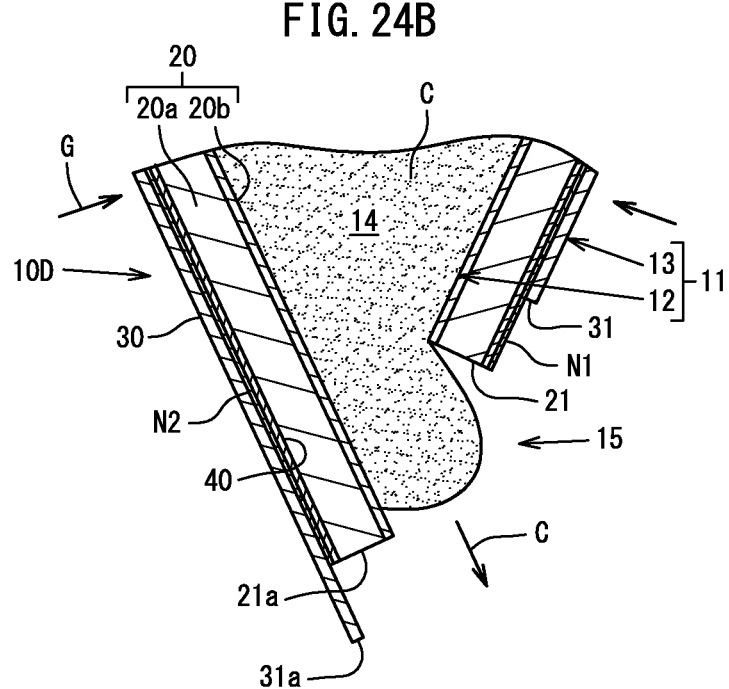

FIGS. 24A and 24B show how to take out the content C from the peel-openable package 10D. In more detail, FIG. 24A is an enlarged cross-sectional view of the foldable portion 15 in a state where the film member 30 is peeled off. FIG. 24B is an enlarged cross-sectional view of the foldable portion 15 in a state where the sealing film 40 is broken.

In the peel-openable package 10D in example 11, the sealing film 40, which is thinner than the film member 30, is provided between the facing surfaces, in the peel region 16, of the sheet member 20 and the film member 30. The sealing film 40 is located on a surface of the sheet member 20 that is to be a peak-side surface when the sheet member 20 is folded, and is in close contact with the sheet member 20 to cover the cutout 21 formed in the sheet member 20 (see FIG. 23).

The sealing film 40 is formed of a single material or a composite material that is the same as that of the sheet member 20 or the film member 30. The sealing film 40 has such a thickness and such a shape as to be broken when the sheet member 20 is folded such that the angle between the two folded portions becomes a predetermined folding angle θ or smaller (see FIG. 24A).

The sealing film 40 is thinner than the film member 30, and has a thickness in the range of 0.005 mm to 0.035 mm.

The cutout 21 formed in the sheet member 20 is sealed with the sealing film 40 bonded to cover the cutout 21 (see FIG. 23).

The film member 30 is bonded to a front surface of the sealing film 40 bonded to the sheet member 20, while the adhesive layer N1 or N2 is held between the film member 30 and the sheet member 20.

This will be described in more detail. In examples 1 through 10, in the case where the package main body 11 of each of the peel-openable packages 10A through 10C and 10G through 10K is deformed by a stress (e.g., bending force, pressure, etc.) applied from outside while being moved, for example, transported or conveyed, or while being packaged, the facing surfaces, in the peel region 16, of the sheet member 20 and the film member 30 may be peeled off from each other.

When the film member 30 covering the cutout 21 in the film member 20 is peeled off, the cutout 21 is released from a sealed state. Therefore, the content C filling the container portion 14 of the package main body 11 is not prevented from leaking through the cutout 21 formed in the sheet member 20.

In addition, foreign objects such as dust, bugs or the like easily enter the container portion 14 of the package main body 11 through the cutout 21 in the sheet member 20. Therefore, it becomes difficult to keep the quality of the content C at the level when the content C is first enclosed, and thus it becomes difficult to keep the content C in a highly hygienic state.

Now, it is assumed that the package main body 11 of the peel-openable package 10D in example 11 is deformed by a stress applied from outside. Even if the film member 30 covering the cutout 21 in the sheet member 20 is peeled off, the cutout 21 is not released from the sealed state until the sheet member 20 is folded such that the angle between the two folded portions becomes a predetermined folding angle θ or smaller to break the sealing film 40 covering the cutout 21 in the sheet member 20. Thus, the cutout 21 formed in the sheet member 20 is kept sealed (see FIG. 24A).

Therefore, the content C filling the container portion 14 of the package main body 11 is prevented with more certainty from leaking through the cutout 2 in the sheet member 20. In addition, the foreign objects as described above are prevented with certainty from entering the container portion 14 of the package main body 11 through the cutout 21 in the sheet member 20.

As a result, the quality of the content C is kept at the level when the content C is first enclosed, and thus the content C is kept in a highly hygienic state.

The sealing film 40 covering the cutout 21 in the sheet member 20 is broken merely by folding the sheet member 20 such that the angle between the two folded portions becomes a predetermined folding angle θ or smaller. Therefore, the cutout 21 in the film member 20 is easily released from the state of being sealed by the sealing film 40 (see FIG. 24B).

As a result, the content C filling the container portion 14 of the package main body 11 is taken out smoothly from the peel-opened portion of the sheet member 20 and the film member 30.

The sealing film 40 may be formed of a single material or a composite material that is the same as that of the sheet member 20 or the film member 30. In this case, the physical properties of at least one of the members 20 and 30, and the physical properties of the sealing film 40, are provided in a synergistic manner. For example, the gas barrier property, the anti-humidity property, the level of odor or the like is improved, and the quality of the content C filling the container portion 14 of the package main body 11 is kept at a high level.

In example 11, the peel-openable package 10D includes the sealing film 40. Alternatively, the peel-openable package 10D may include a sealing layer 41 as shown in FIG. 25.

Figure 25:
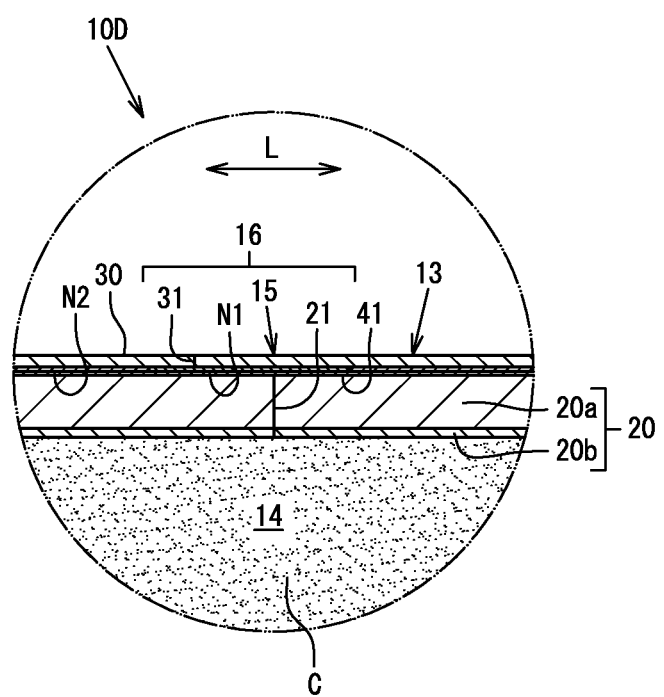
FIG. 25 shows a peel-openable package including a sealing layer.

FIG. 25 shows the peel-openable package 10D including the sealing layer 41. In more detail, FIG. 25 is an enlarged cross-sectional view of the foldable portion 15 showing a state where the sealing layer 41 is formed by coating.

In the peel-openable package 10D, the sealing layer 41, which is thinner than the sealing film 40, is formed by coating such that the sealing layer 41 is located on a surface of the sheet member 20 that is to be a peak-side surface when the sheet member 20 is folded, and is in close contact with the sheet member 20 to cover the cutout 21 formed in the sheet member 20. The film member 30 is bonded to a front surface of the sealing layer 41 formed by coating while the adhesive layer N1 or N2 is held therebetween.

Like in the case of the sealing film 40, the cutout 21 in the sheet member 20 is not released from the state of being sealed by the sealing layer 41 until the sheet member 20 is folded such that the angle between the two folded portions becomes a predetermined folding angle θ or smaller to break the sealing layer 41 covering the cutout 21 in the sheet member 20. Thus, the cutout 21 formed in the sheet member 20 is kept sealed. Therefore, the function and the effect substantially equivalent to those of the peel-openable package 10D including the sealing film 40 in example 11 are provided.

The sealing layer 41 is formed by coating so as to cover the cutout 21 in the sheet member 20. Therefore, the sealing layer 41 is made thinner than the sealing film 40 described above. Thus, the folding force required to break the sealing layer 41 is smaller than the folding force required to break the sealing film 40. For this reason, the sealing layer 41 is broken more simply and more easily than the sealing film 40.

In examples 1 through 11, the cutouts 21 and 31 are away from each other with a predetermined interval extending in the longitudinal direction L. Alternatively, the cutouts 21 and 31 may be located at any desirable pattern as shown in FIGS. 26A, 26B, and 26C.

Figure 26A:
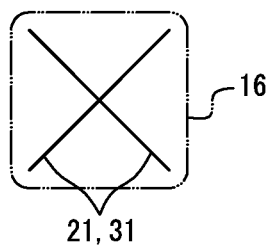
FIGS. 26A, 26B, and 26C show examples in which the cutouts are arranged in desirable patterns.
Figure 26B:
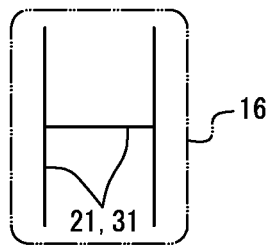
Figure 26C:
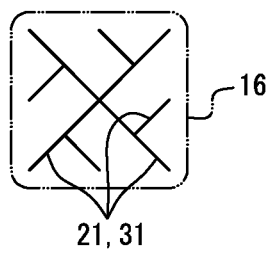

FIGS. 26A, 26B, and 26C show examples in which the cutouts 21 and 31 are located at any desirable pattern This will be described in detail. As shown in FIG. 26A, the cutouts 21 and 31 may be arranged in an X-shape as seen in a plan view. As shown in FIG. 26B, the cutouts 21 and 31 may be arranged in an H-shape as seen in a plan view. As shown in FIG. 26C, the cutouts 21 and 31 may be arranged in a combination of an X-shape and shorter lines perpendicular thereto, as seen in a plan view.

When the sheet member 20 and the film member 30 are folded into two to peel off the facing surfaces, in the peel region 16, of the members 20 and 30 from each other, the portions in the peel region 16 of the sheet member 20 and the film member 30 are opened as being divided into a plurality of portions in accordance with the arrangement of the cutouts 21 and 31.

In this state, the content C is extruded through the cutouts 21 and 31 while being in contact with the plurality of portions divided by the cutouts 21 and 31 (e.g., in contact with sides, edges, etc.). Therefore, the content C is more difficult to be extruded at once than when in contact with the tongues 21a and 31a shown in FIG. 4B. Thus, the content C is prevented with more certainty from splashing around.

As a result, the function and the effect substantially equivalent to, or greater than, those in examples 1 through 11 are provided.

The peel-openable package according to one or more embodiments of the present invention corresponds to the peel-openable packages 10A through 10D and 10G through 10K in the above-described embodiment; and similarly, the inner member corresponds to the sheet member 20;

the outer member corresponds to the film member 30; and the sealing portion corresponds to the sealing film 40 and the sealing layer 41.

However, the present invention is not limited to the above-described embodiments. The present invention has many applications based on the technological idea defined by the claims, and may be carried out in any of many embodiments.

In examples 1 through 10, facing surfaces of the sheet member 20 and the film member 30 in a region other than the peel region 16 are bonded together by the adhesive layer N2 so as not to be peelable from each other. Alternatively, for example, the entirety of the facing surfaces of the sheet member 20 and the film member 30 may be bonded together by the adhesive layer N1 so as to be peelable from each other.

In example 11, the cutout 21 in the sheet member 20 is sealed by the sealing film 40 or the sealing layer 41. Alternatively, the cutout 21 may be sealed by, for example, a foil formed of a synthetic resin, a metal material or the like, or by a film, as long as these elements are sufficiently strong to prevent the content C from leaking. The cutout 21 is not limited to being sealed by the sealing film 40 or the sealing layer 41.

REFERENCE SIGNS LIST

G . . . Folding direction
L . . . Longitudinal direction
W . . . Width direction
T . . . Thickness direction
C . . . Content
N1, N2 . . . Adhesive layer
10A-10D . . . Peel-openable package
10G-10K . . . Peel-openable package
11 . . . Package main body
12 . . . Main body portion
13 . . . Lid
14 . . . Container portion
15 . . . Foldable portion
16 . . . Peel region
20 . . . Sheet member
30 . . . Film member
21, 31, Cutout
24 . . . Recessed portion
25 . . . Folding line
40 . . . Sealing film
41 . . . Sealing layer
42 . . . Protrusion portion

The invention claimed is:

1. A peel-openable package, comprising:
a package main body having a content enclosed therein, at least a part of the package main body including:
an inner member located at a position corresponding to an inner portion of the package main body; and
an outer member bonded to a surface of the inner member, the surface corresponding to an outer portion of the package main body;
wherein:
the inner member and the outer member have a foldable portion in an area thereof where the inner member and the outer member are folded to be bonded together;
the foldable portion includes a peel region where the inner member and the outer member are allowed to be peeled off from each other thereby forming a through-hole that passes through the inner member and the outer member when the inner member and the outer member are folded to be bonded together;
the foldable portion includes a cutout, in the peel region, in each of the inner member and the outer member, the cutouts extending so as to cross a direction corresponding to a folding direction in which the foldable portion is folded, and the cutouts each being formed into the through-hole passing in a thickness direction through the inner member and the outer member when the foldable portion is folded;
the cutout formed in the inner member and the cutout formed in the outer member are away from each other by a predetermined interval, the predetermined interval extends in the direction corresponding to the folding direction, and the cutouts formed in the inner member and the outer member comprise a stair-shaped inner wall of the through-hole;
facing surfaces of the inner member and the outer member facing each other are bonded together by an adhesive layer provided between the facing surfaces such that the facing surfaces are peelable from each other, the facing faces being defined in at least the peel region;
a sealing member is provided between the facing surfaces, of the inner member and the outer member, defined in the peel region, the sealing member being broken when the inner member is folded at a predetermined angle or greater; and
the sealing member is located on a surface of the inner member that is to be a peak-side surface when the inner member is folded, and covers the cutout formed in the inner member.

2. The peel-openable package according to claim 1, wherein the inner member is thicker than the outer member.

3. The peel-openable package according to claim 1, wherein the adhesive layer is provided between the facing surfaces in the peel region, in positional correspondence with an area between the cutouts formed in the inner member and the outer member.

4. The peel-openable package according to claim 1, wherein the inner member and the outer member are not allowed to be peeled off from each other in a region other than the peel region.

5. The peel-openable package according to claim 1, wherein the cutouts each have a width shorter than a width of the inner member.

6. The peel-openable package according to claim 1, wherein the predetermined interval between the cutouts formed in the inner member and the outer member has a length that is about 0.5 times to about 100 times a thickness of the inner member.

7. The peel-openable package according to claim 1, wherein one of the cutouts formed in the inner member and the outer member is longer than the other of the cutouts.

8. The peel-openable package according to claim 1, wherein the cutouts formed in the inner member and the outer member have the same shape as each other, or different shapes from each other, as seen in the thickness direction.

9. The peel-openable package according to claim 1, wherein the cutouts each include a plurality of holes running in the thickness direction, the plurality of holes being provided in a perforation extending so as to cross the direction corresponding to the folding direction.

10. The peel-openable package according to claim 1, wherein a folding line assisting folding of the inner member is provided between two ends of the inner member in a width direction and two ends of the cutouts in the width direction.

11. The peel-openable package according to claim 1, wherein the sealing member includes a sealing film or a coated sealing layer having a thickness smaller than a thickness of the outer member.

* * * * *